United States Patent [19]

Takahasi et al.

[11] Patent Number: 5,426,752
[45] Date of Patent: Jun. 20, 1995

[54] METHOD FOR ALLOCATING REAL PAGES TO VIRTUAL PAGES HAVING DIFFERENT PAGE SIZES THEREFROM

[75] Inventors: Kikuo Takahasi; Toyohiko Kagimasa, both of Hachioji; Yoshiki Matsuda, Kokubunji; Toshiaki Mori, Hachioji, all of Japan

[73] Assignee: Hitachi, Ltd., Tokyo, Japan

[21] Appl. No.: 232,400

[22] Filed: Apr. 25, 1994

Related U.S. Application Data

[63] Continuation of Ser. No. 551,416, Jul. 12, 1990, abandoned.

[30] Foreign Application Priority Data

Jul. 14, 1989 [JP] Japan ................... 1-180323

[51] Int. Cl.6 ............................................. G06F 12/08
[52] U.S. Cl. .................................................... 395/400
[58] Field of Search ............................. 395/400, 425; 364/200 MS File, 900 MS File; 365/230.01, 230.03

[56] References Cited

U.S. PATENT DOCUMENTS

| | | | |
|---|---|---|---|
| 4,373,179 | 2/1983 | Katsumata | 395/400 |
| 4,758,951 | 7/1988 | Sznyter, III | 395/400 |
| 4,835,734 | 5/1989 | Kodaira et al. | 395/400 |
| 4,903,234 | 2/1990 | Sakuraba et al. | 365/49 |
| 4,967,353 | 10/1990 | Brenner et al. | 395/425 |
| 4,991,082 | 2/1991 | Yoshizawa et al. | 395/400 |
| 4,992,936 | 2/1991 | Katada et al. | 395/400 |
| 5,023,777 | 6/1991 | Sawamoto | 395/400 |
| 5,058,003 | 10/1991 | White | 395/400 |

FOREIGN PATENT DOCUMENTS

| | | |
|---|---|---|
| 53-114318 | 10/1978 | Japan . |
| 57-012494 | 1/1982 | Japan . |
| 58-17586 | 2/1983 | Japan . |
| 60-204048 | 10/1985 | Japan . |
| 62-274351 | 11/1987 | Japan . |
| 63-37445 | 2/1988 | Japan . |
| 63-3037445 | 2/1988 | Japan . |
| 63-289659 | 11/1988 | Japan . |
| 0117137 | 1/1989 | Japan . |
| 0117138 | 1/1989 | Japan . |
| 01109451 | 4/1989 | Japan . |

Primary Examiner—Jack B. Harvey
Assistant Examiner—Jack A. Lane
Attorney, Agent, or Firm—Antonelli, Terry, Stout & Kraus

[57] ABSTRACT

A method for allocating real pages larger than a conventional size to a plurality of virtual pages of the conventional size in a system including a real storage containing a plurality of real pages and a storage key for holding storage keys used for storage protection purposes of the real pages. The method includes the steps of (A) allocating one of plural split regions having the conventional size obtained by subdividing one of a plurality of real pages having a larger size equal to a value n being a positive integer larger than 1) times larger than the conventional size, to one virtual page having the conventional size (B) repeating step (A) so that split regions having the conventional size within the one real page and within other real pages having the larger size are allocated to virtual pages having the conventional size. Either a real page of a larger size or a group of consecutively located split regions of the convention size are allocated to a virtual page of a size larger than the conventional size.

19 Claims, 23 Drawing Sheets

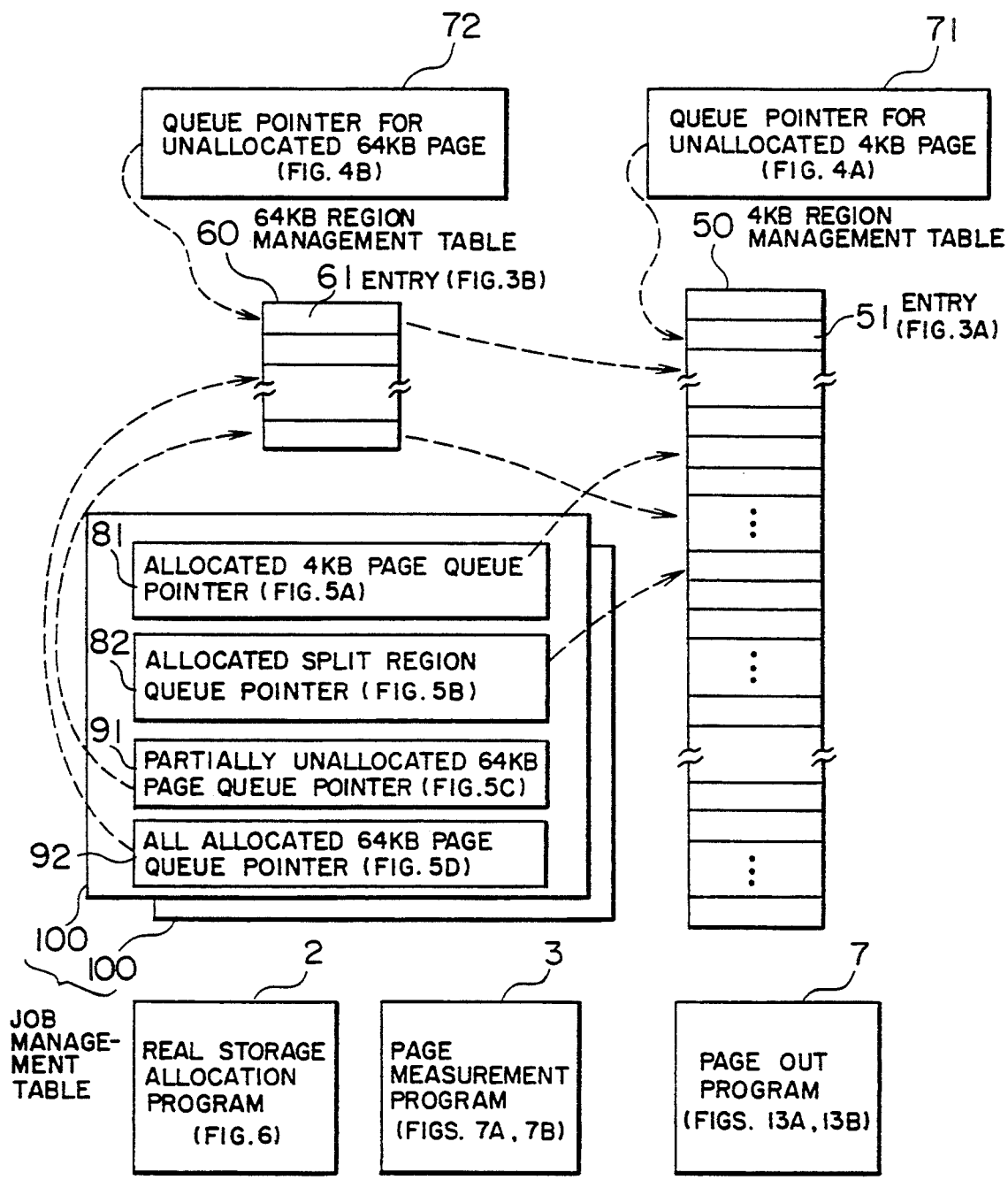

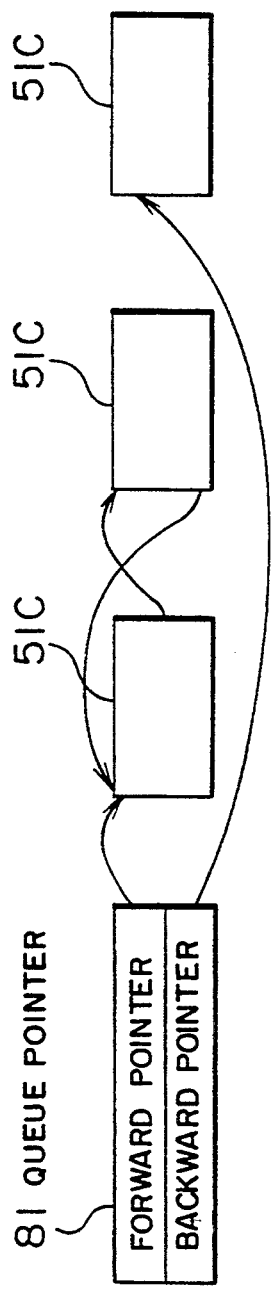
F I G. 5A
810 ALLOCATED 4KB PAGE QUEUE (FOR EACH JOB)
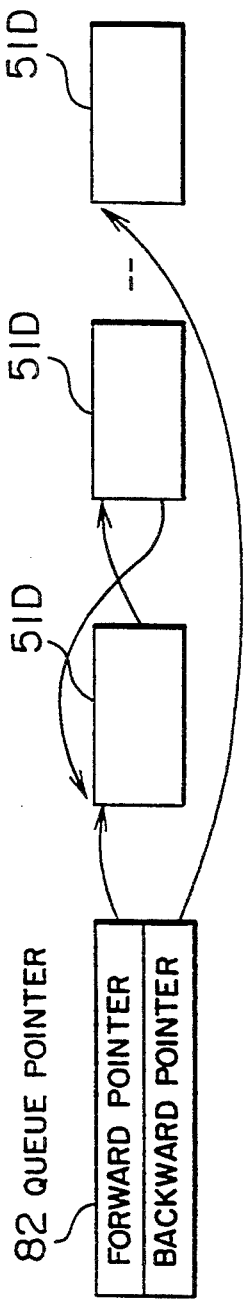
F I G. 5B
820 ALLOCATED SPLIT REGION QUEUE (FOR EACH JOB)

4KB REGION MANAGEMENT TABLE

1750 QUEUE FOR EXCLUSIVE AREA CONSTRUCTED OF 64KB REAL PAGES

175 QUEUE POINTER 1760 64KB ALLOCATED PAGE QUEUE (FOR EACH JOB)

176 QUEUE POINTER (REMARK)
NPAGE: EXTERNALLY SUPPLIED PARAMETER

F I G. 16A
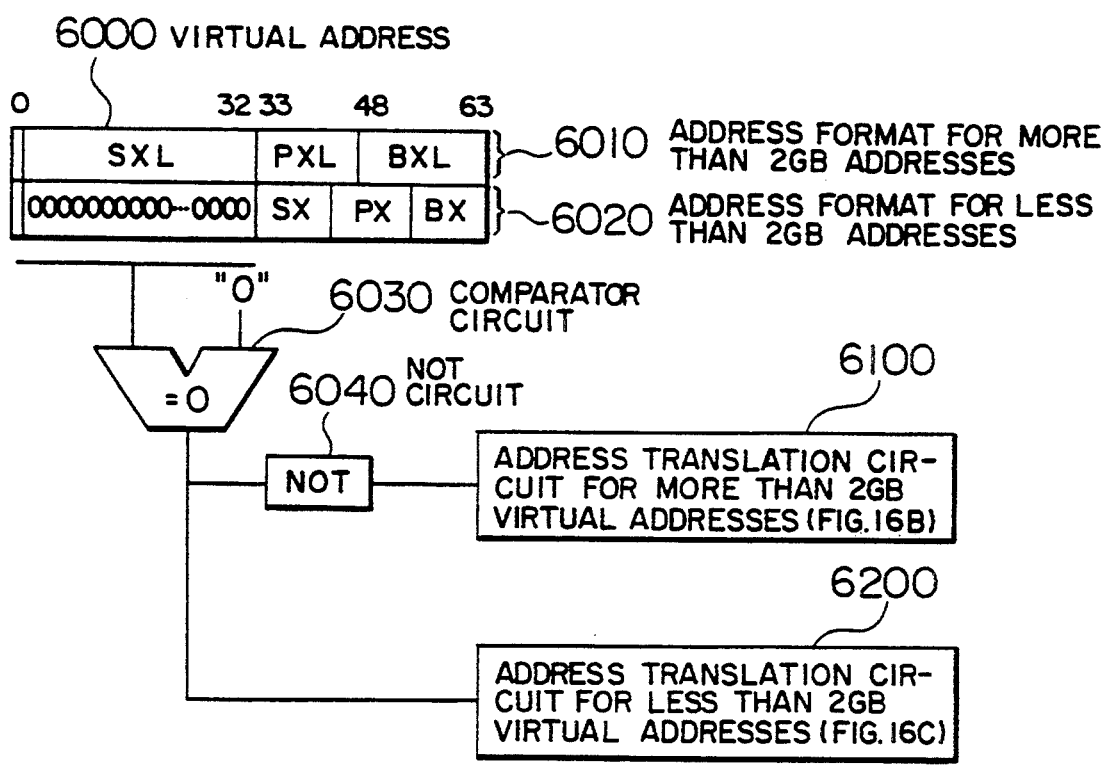

METHOD FOR ALLOCATING REAL PAGES TO VIRTUAL PAGES HAVING DIFFERENT PAGE SIZES THEREFROM

This application is a continuation application of Ser. No. 07/551,416, filed Jul. 12, 1990, now abandoned.

BACKGROUND OF THE INVENTION

The present invention generally relates to a method for allocating real pages in a real storage to each virtual page in a virtual storage type computer system. More specifically, the present invention is directed to a real storage allocation method suitable for such a computer system employing a real storage apparatus having a large storage capacity.

In the conventional virtual storage system employing the on-demand paging method, both the virtual storage and real storage are subdivided into so-called "pages" having the same sizes, and then the virtual storage page corresponds to the relevant real storage page in a 1:1 page unit relationship employing an address translation table.

On the other hand, since very recently, computerization has advanced considerably, and the scale of information to be processed by computers becomes very large. Accordingly, memory capacities of storage apparatuses employed in these computers become very large similarly.

As a result, a total number of pages employed in these storage apparatus becomes huge.

(1) Problems with storage capacity expansion of a real storage apparatus.

Since the operating system manages the real storage apparatus in the divisional unit of the real storage apparatus, i.e., in the page unit, a huge number of pages must be managed as compared with the storage capacity of the real storage apparatus, so that the operating system per se greatly consumes such a resource, e.g., a CPU time (central processing unit time) and a real storage in order to perform the management. In other words, the managing overhead for the operating system becomes large. Furthermore, as storage protection keys are provided with the respective pages of the real storage with 1:1 correspondence therebetween for a storage protection purpose, a total number of these storage protection keys also increases greatly. The memory for storing a storage protection key is referred to as a "key storage apparatus", which is constructed of memory elements having a higher speed than that of the real storage. This is because the accessing performance of the key storage may greatly influence the performance of the overall system. As a result, there is such a problem that when the storage capacity of the real storage becomes larger and larger, the great storage capacity of the expansive key storage is required, but also the entire hardware cannot be packaged within a predetermined packaging area, whereby the accessing performance of the key storage is deteriorated. To solve this problem, the size of the real page may be extended or expanded. This solution is described in, for instance, JP-A-60-204048 and JP-A-63-289659.

In accordance with the expansion of the real page sizes of prior art, only the virtual pages having the same sizes as those of the expanded real pages can be allocated to the real storage regions constructed of the expanded real pages.

However, generally speaking, as the conventional programs have been formed, taking account of the sizes of the virtual pages, there are some programs which cannot be executed if the virtual page size is extended, or expanded.

(2) Problems with capacity expansion of virtual storage apparatus.

Between the virtual storage and real storage, the virtual address corresponds to the real address in 1:1 correspondence in the unit of the virtual page size by way of the address translation table. Since the address translation table has the entries for each virtual page size, the virtual page size remains. If the capacity of the virtual storage apparatus becomes great, the capacity of the address translation table becomes large also. To reduce the capacity of this address translation table, a large virtual page size may be selected. In this case, for the sake of compatibility among the conventional programs, it is preferable to employ the virtual pages having both the conventional size and the extended size in the same virtual storage apparatus. Moreover, it is preferable such that the real page of the real storage apparatus may be allocated to the virtual pages having any sizes. These conventional ideas are described in, for instance, JP-A-53-114318, JP-A-58-17586, JP-A-62-274351, JP-A-63-37445, JP-A-63-289659, JP-A-64-17137, JP-A-64-27138, and JP-A-01-109451.

In accordance with these conventional techniques, some real pages of the conventional size are grouped; and one of these real page groups is allocated to a virtual page having a larger size than the conventional size, whereas one real page within one real page group is allocated to a virtual page having a smaller size than the conventional size.

Furthermore, for example in JP-A-63-37445 listed above, a key of storage keys of real pages of each real page group is employed as a representative storage key to control accesses to respective pages within the real page group. Also, there is provided either a representative reference bit (R), or a representative change bit (C) for each real page group. A check can be made whether or not either the reference operation or rewriting operation has been done to each real page group, based upon the representative bit (R) or the representative change bit (C), stored for each real page group. However, circuits for accessing these representative storage keys, representative reference bits, and representative change bits are newly required in this conventional allocation method.

In addition, there is no clear description in these conventional allocation methods for a method for determining to which real page within the real page group a virtual page having the smaller size is to be allocated. Depending upon a specific allocation method which may be adopted, only a portion of each of many real page groups will be allocated to virtual pages of conventional size. As a result, some real pages which have not yet been allocated to virtual pages still remain, but there might not be a real page group to be allocated to a virtual page having the larger size.

Use of enlarge real pages instead of grouping real pages to obtain an enlarged real area and use of a single key for each enlarged real page is also proposed in the prior art, for example in JP-A-63-289659, listed hereinabove. In the prior art of this kind, however, similar problems mentioned above remain.

SUMMARY OF THE INVENTION

An object of the present invention is to provide a real storage allocation method capable of allocating a virtual page to a real page greater than the virtual page.

Another object of the present invention is to provide a real storage allocation method by which real pages smaller than virtual pages are grouped and the grouped real pages may be allocated to the virtual pages, and furthermore, a circuit for rewriting or referencing a storage key, or another circuit for determining a reference of the real page, may be made simple.

Still another object of the present invention is to provide a real storage allocation method capable of allocating a real page to a plurality of virtual pages having different sizes under small occurrence of fragmentation.

To achieve the above-described objects, in a storage management method according to the present invention, as a page allocation method for when the virtual page size is different from the real page size which also functions as a key attachment unit for storage protection purposes, the real pages are subdivided into 1/n split regions ("n" being a positive integer) so as to be managed in such a manner that the real page is allocated to the virtual page in the unit of the subdivision when the virtual page size is 1/n times larger than the real page size.

Also, when the virtual page size is n times larger than the real page size, a search is made to n pieces of continuous real pages in which the real page having an address obtained by multiplying the virtual page size by an integer is present as a lead real page. Thus, the real storage region constructed of the page size different from the virtual page size is allocated in the unit of the virtual page size by corresponding "n" pieces of continuous real pages to a single virtual page. Further, in such a case wherein the virtual page sizes having page sizes 1/n times or "n" times larger than the real page size, the real storage region may be allocated with both larger and smaller virtual page sizes and real page sizes by employing either method for the above-explained 1/n times or n times cases. In addition, when the use frequencies of the pages are investigated, the use frequency measurement for the pages is performed in the unit of the larger size selected from the virtual page size and real page size, whereby the above-described objects may be achieved.

(1) When the virtual page size is smaller than the real page size (1/n times), the inside of this real page is subdivided into 1/n and then allocated in the virtual page size, so that the real page size functioning as the key attachment unit can be selected to be large irrespective of the virtual page size. Consequently, the number of the real pages and also the number of the entries (reference numeral 6 shown in FIG. 1) for the key storage (reference numeral 5 shown in FIG. 1) may be reduced, whereby it can prevent the entry number of the key storages from becoming large due to an increase in the real storage. Also, since it can prevent the entry number of the key storage from becoming huge, the deterioration of the accessing performance of the main storage can be suppressed.

Also, in this case, when the use frequency of the pages is investigated, the use frequency measurement of the pages is performed in the unit of the real page size, i.e., the larger page size between the virtual page size and real page size. As a result, the total number of the measurement pages can be reduced and also the process time of the operating system required for the page measurement can be shortened.

(2) When the virtual page is n times larger than the real page size, assume now that n pieces of the continuous real pages are equivalent to a single real page having the same size as that of the virtual page, and thus are allocated to a single virtual page. In this case, the total size of the measurement page can be reduced by performing the use frequency measurement of the pages in the unit of the virtual page size. Accordingly, the process time of the operating system required for the page measurement can be shortened.

(3) When virtual pages having the page sizes 1/n or n times larger than the real page size are intermingled, the real storage can be utilized at a rather high efficiency in the combination between the virtual page size and real page size by utilizing the above-described method (1) or (2), by the mutual utilization between the virtual pages and real pages, each having the different page sizes.

BRIEF DESCRIPTION OF THE DRAWINGS

FIG. 2 illustrates a corresponding relationship between a constituent element and a real storage in the first preferred embodiment of the present invention;

FIGS. 3A, 3B, 4A, 4B, and 5A through 3D are explanatory diagrams of real storage management tables in the first preferred embodiment of the present invention;

FIGS. 16A to 16C schematically represent address translation according to the second preferred embodiment;

DESCRIPTION OF THE PREFERRED EMBODIMENTS

Referring now to drawings, various preferred embodiments according to the present invention will be described.

Figure 1:
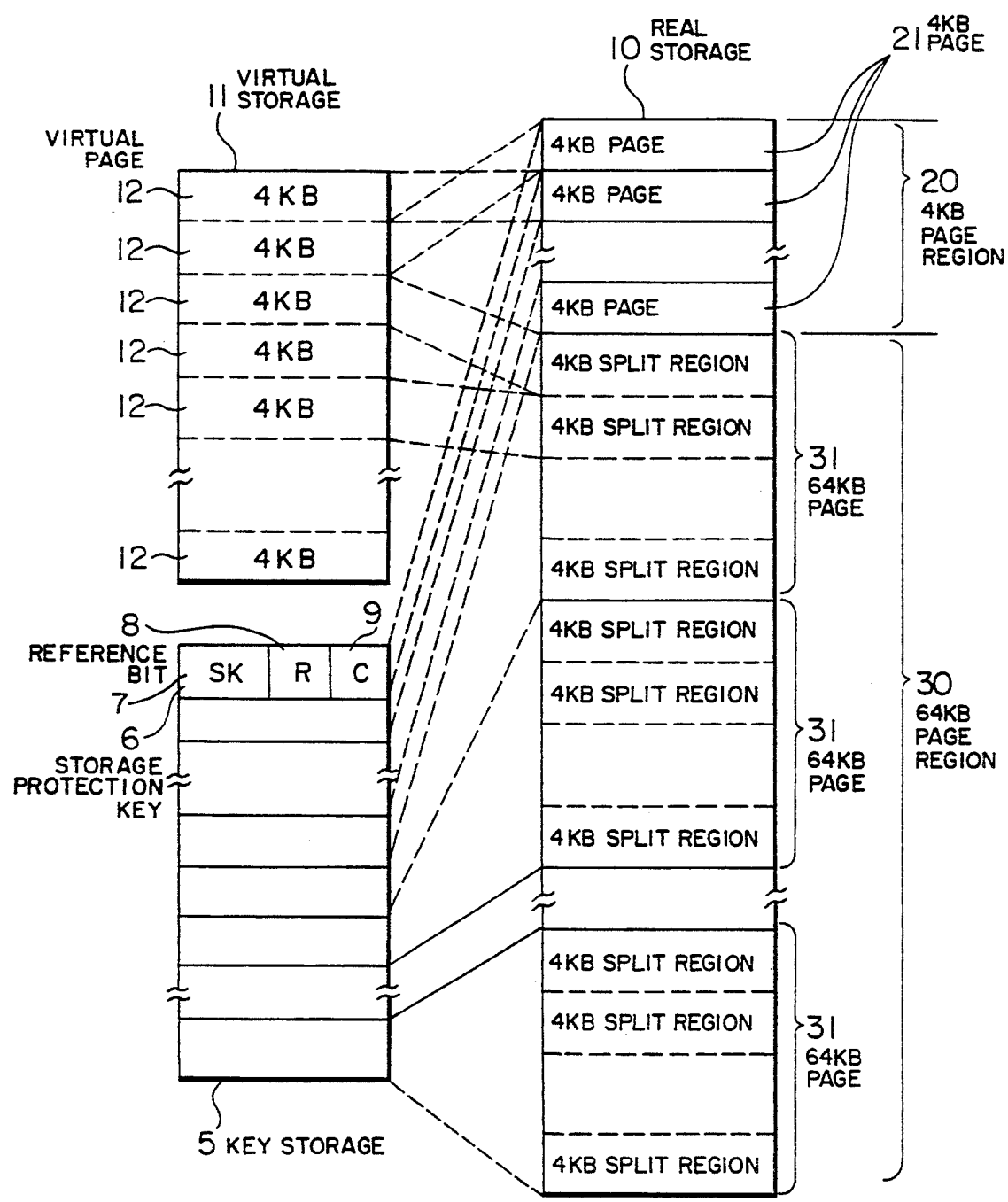
FIG. 1 represents a structure of a virtual storage and a real storage according to a first preferred embodiment of the present invention.

In the first preferred embodiment, as represented in FIG. 1, a virtual storage, or memory 11 is constructed of a group of virtual pages 12 having a size of 4 KB (kilo bytes). A real storage, or memory 10 is subdivided into two regions 20 and 30 having different real page sizes than the other. The region 20 is constructed of a group of real pages 21, which will be referred to as a "4 KB page region." The region 30 is arranged by a group of real pages 31, which will be called a "64 KB page region." As will be discussed later, in accordance with a feature of this first preferred embodiment, each of the 64 KB pages 31 for constructing the 64 KB page region 30 is subdivided into 4 KB split regions each having a page size equal to the virtual page size, and also each of the divided regions is allocated to one virtual memory or storage. Furthermore, there is another feature that the real storage has a storage capacity larger than that of the virtual storage.

Reference numeral 5 is a key storage for holding a storage protection key with respect to each page of the real storage 10. Each entry 6 of the key storage 5 is arranged by a storage protection key (SK 7) which has been allocated to the corresponding real page; a reference bit (R) indicating whether or not this page is referenced; and, a change bit (C) 9 representing that this page has been rewritten. The respective entries 6 of the key storage 5 are prepared for each page of the 4 KB page region 20, namely every 4 KB, which is similar to the conventional entries. Also, the entries 6 are prepared for each page of the 64 KB page region 30, namely 64 KB. In other words, a key attaching unit of the real page according to this preferred embodiment corresponds to the key attaching unit of the storage protection key similar to that of the conventional allocation method. Since the real page size has been expanded from 4 KB to 64 KB in the 64 KB page region, the key attaching unit of the real storage per a unit capacity is reduced to 1/16, as compared with that of the 4 KB page region 20, so as to prevent an increase of the key storage capacity.

FIG. 2 represents both a program and a management table contained in an operating system. In this figure, reference numeral 2 indicates a program for allocating a real storage; reference numeral 3 indicates a page measurement program; and reference numeral 7 denotes a page out program. In accordance with the real storage allocating program 2, when a demand for allocating a real storage is issued from the program for a certain virtual page, the region of the real storage is allocated in the virtual page unit. Although a detailed description thereof will be made with reference to FIG. 6, this allocation is performed as follows. More specifically, one 4 KB empty region is selected from the real storage, an address of the selected real storage region is set on the entry of the address translation table corresponding to the virtual page to be allocated, and the translation from the virtual address into the real address can be executed. That is to say, the virtual page according to the present invention employs the address translation unit from the virtual address to the real address, which is similar to the conventional address translation unit. The function of the page measurement program 3 is to measure a frequency in use of respective virtual pages which have been allocated to the real storage. Based on these measurement results, a page out program 7 successively pages out, into an auxiliary storage, information on the real storage which has been allocated to the virtual page on the order of low use frequency. Thus, the measurement results are used to control usable real storage to have a predetermined amount. In FIG. 2, reference numerals 50 and 60 indicate a real storage management table for managing the present allocation condition of the real storage. The 4 KB region management table 50 holds the real storage region having the same size as the virtual page size, namely holds an entry 51 corresponding to each of the 4 KB real pages and also to each of the divided regions of the respective 64 KB pages. Each entry holds information representative of the allocation condition of the 4 KB region with the corresponding real storage. As will be described later, a queue of an entry (queue 710 of an unallocated 4 KB region, FIG. 4A) corresponding to the 4 KB real storage region which has not yet been allocated to the virtual page is formed within the entry of this management table 50. Reference numeral 71 indicates a pointer for representing a lead entry of this queue. Also, the 64 KB region management table 60 has an entry 61 corresponding to the respective 64 KB real pages in the 64 KB page region 30. Each of the entries holds information on the allocation condition of the corresponding 64 KB page. As will be discussed later, a queue of an entry (a queue 720 of an unallocated 64 KB region, FIG. 4B) corresponding to the 64 KB real storage region, which has not yet been allocated to the virtual page is formed within the entries of this management table 60. Reference numeral 72 indicates a pointer for indicating a lead entry of this queue. Also reference numeral 100 indicates a job management table which is employed for each program (job). In this management table, as will be described later, there is formed an entry queue (an allocated 4 KB page queue 810, FIG. 5A) within the table 50 corresponding to the 4 KB real page in which each job has been allocated to the virtual page under use. Reference numeral 81 denotes a pointer representative of a lead entry of this queue. Further, as will be described later, there is formed an entry queue (as allocated divided region queue 820, FIG. 5B) within the table 50 corresponding to the divided region in which each job has been allocated to the virtual page under use. Reference numeral 82 indicates a pointer representative of a lead entry of this queue. Also, as to each job, there is formed an entry queue (a queue 910 for a partially not-yet-allocated 64 KB page, FIG. 5C) with respect to such a 64 KB real page that a part of the divided regions in the 64 KB page is not yet allocated, in which each job is under use. Reference numeral 91 denotes a pointer indicative of a lead entry of this queue. Further, as to the respective jobs, there is formed an entry queue (an all allocated 64 KB page queue 920, FIG. 5D) of the table corresponding to such a 64 KB real page that all of the divided regions in the 64 KB page thereof have been allocated, in which each job is under use. Reference numeral 92 is a pointer indicative of a lead entry of this queue.

Figure 3A:
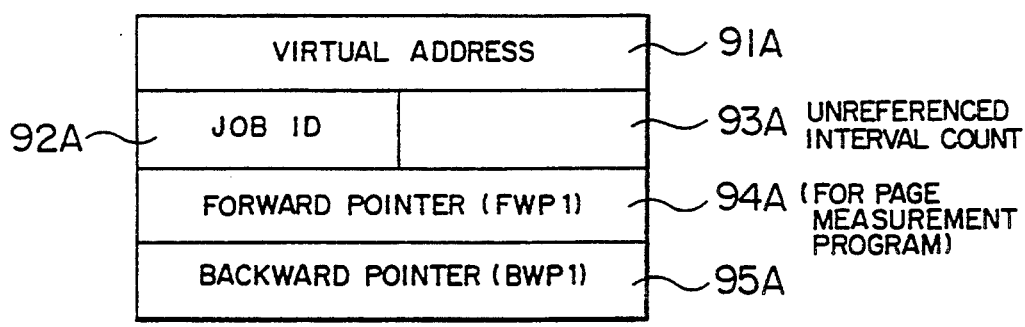

FIG. 3A represents various information in one entry 51 of the 4 KB region management table 50. This entry 51 is employed for each of the 4 KB regions in the real storage 10. In a field 91A, a virtual address of a virtual page which has been allocated to the 4 KB region corresponding to the entry of the real storage is set, furthermore in a field 92A, an identifier (a job ID) of a job using this virtual page is set. In a field 93A, a time (unused time) during which the 4 KB region corresponding to the real storage has been most recently used and is presently used, has been set. It should be noted that none of the sets described above is required for such an entry 51 corresponding to the 4 KB divided region which is obtained by splitting the 64 KB real page. Both a field 94A and a field 95A are used when this entry is in queuing to the other entry within the management table 50. In the first field 94A, an address of an entry (a forward pointer FWP1) subsequent to this entry is set. In the second field 95A, an address of a preceding entry (a backward pointer BWP1) of this entry is set.

Figure 3B:
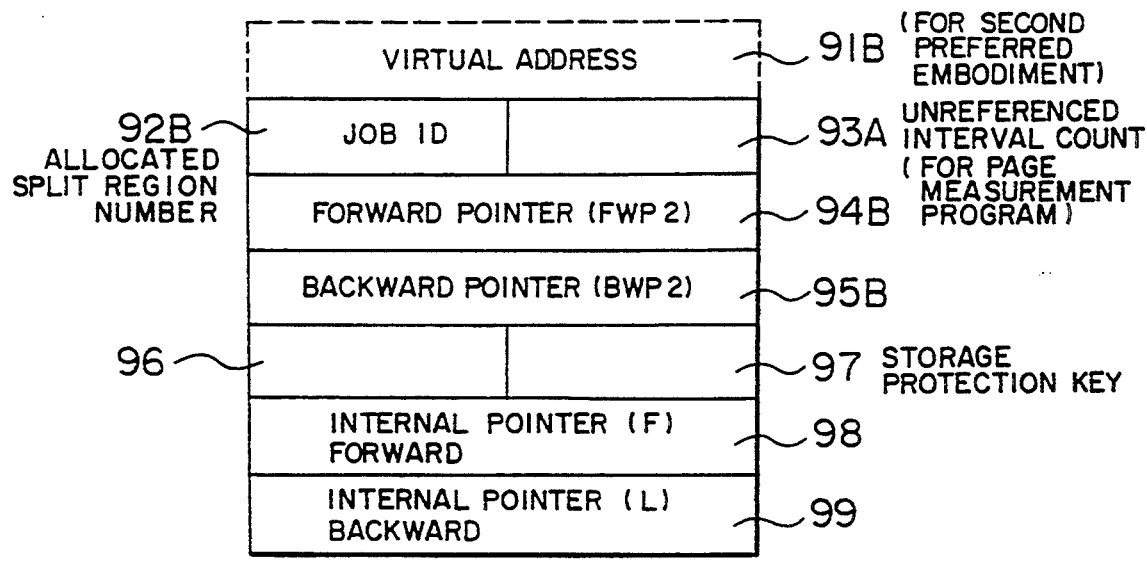

FIG. 3B also represents various information on one entry 61 of the 64 KB region management table. This entry is provided in correspondence with each of the 64 KB real pages for the real storage 10. In fields 91B, 92B, 93B, 94B and 95B, information having the same meanings as those of the above-described fields 91A, 92A, 93A, 94A and 95A shown in FIG. 3A are set. In a field 96, the number of the split regions which have been allocated to the virtual page among 16 split regions in the 64 KB page corresponding to this entry, is set. A storage protection key is set into a field 97, belonging to the virtual page allocated to the split region when the split region within the corresponding 64 KB real page is used at the beginning. As will be discussed later, this storage protection key is used so that the storage protection keys of the 16 virtual pages allocated to the 64 KB real page are not contradictory to each other, but rather are identical to each other. The fields 98 and 99 are used when there is formed a queue of the entry 51 within the 4 KB region management table 50 with respect to the 16 split regions in the 64 KB page corresponding to this entry.

Figure 4A:
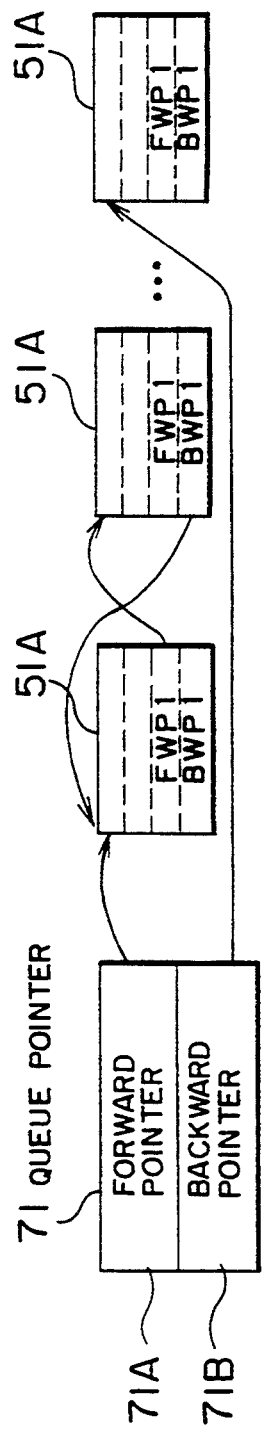

In FIG. 4A, there is shown a 4 KB unallocated region queue 710. This queue is constructed by connecting a group of the entry 51A of the table 50 by a pointer with respect to such a region that the virtual page has not yet been allocated among the respective 4 KB regions of the real storage 10. In a forward pointer (FWP1) within the respective entries 51A for the 4 KB unallocated region of the real storage, an address for the entry 51A corresponding to a succeeding unallocated 4 KB region is set. Another address of the other entry 51A with respect to a preceding 4 KB unallocated region has been set in a backward pointer (BWP1) in this entry 51A. Furthermore, in the 4 KB unallocated region queue pointer, the address of the lead entry positioned in this entry series has been set as the forward pointer 71A, and the address of the end entry positioned in this entry series has been set as the backward pointer 71B. Thus, a queue 710 may be formed. It should be noted that "0" is set to the pointers 71A and 71B when there is no such entry. This may be similarly applied to other queues.

A judgement can be made of the 4 KB unallocated region by investigating a queue of entry 51A connected to the pointer 71.

Figure 4B:
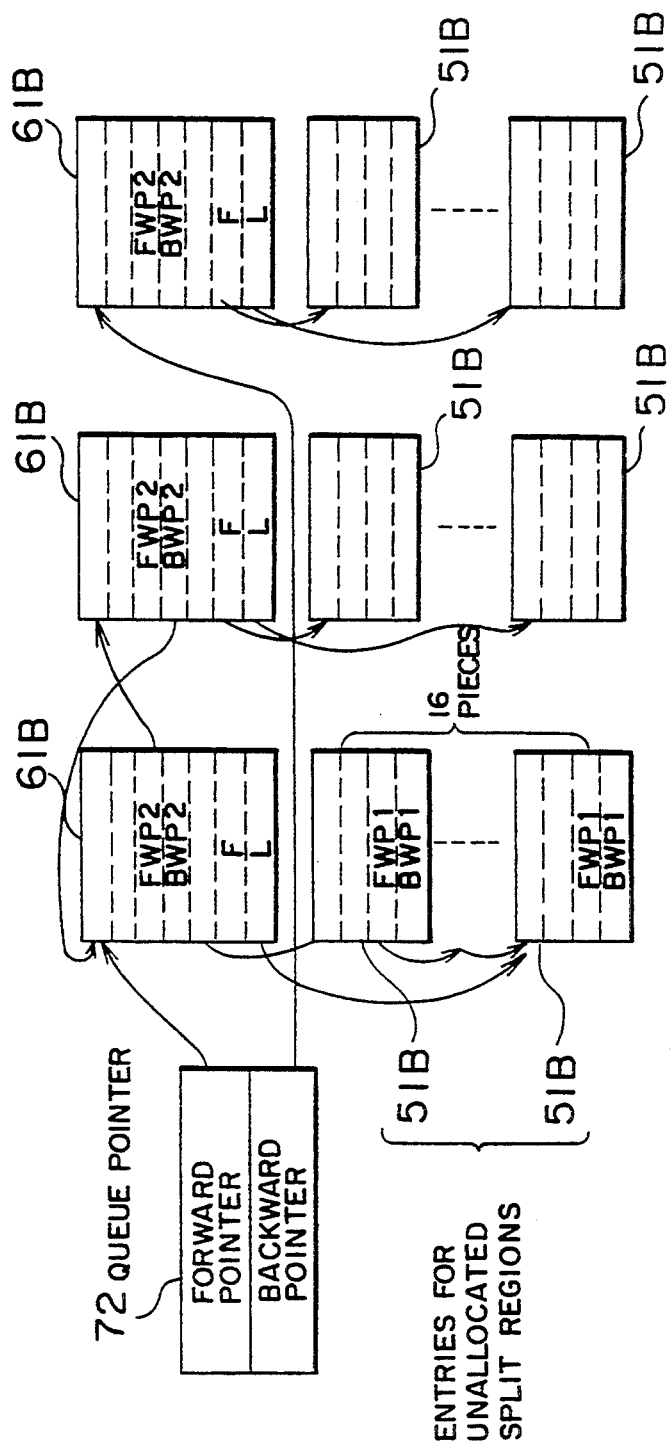

FIG. 4B represents a 64 KB unallocated page queue 720. This queue is constructed of a series of the entry 61B of the table 60 with respect to a 64 KB page of the real storage 10 in which none of the split regions thereof has been allocated to the virtual page, and of a series of the entry 51B of the table 50 with respect to the 16 split regions among the 64 KB page. In other words, to a forward pointer (FWP2) of the entry 61B for the table 60 and also a backward pointer (BWP2) of the entry 61B for the unallocated 64 KB page, an address of the entry 61B for another unallocated 64 KB page subsequent to the first-mentioned unallocated 64 KB page, and also an address of this entry 613 for another unallocated 64 KB page preceding to the first-mentioned unallocated 64 KB page are set, respectively. An address of the lead entry for a series of the entry 51B and an address of the end entry thereof are set as the forward pointer and backward pointer, respectively. As previously described, the queue 720 may be so formed. In addition, a series of an entry 51B is formed in such a manner that both an address of the entry 51B of the table 50 within the same 64 KB page with respect to the succeeding split region, and also another address of this entry 51B of the table 50 within this 64 KB page with regard to the preceding split region are set into the formed pointer (FWP1) and backward pointer (BWP1) of the entry 51B of the table 50 with respect to the 16 split regions contained in the unallocated 64 KB page.

FIG. 5A illustrates an allocated 4 KB page queue 810 for a certain job. The page queue 810 is arranged by a series of an entry 51C of a table 50 and also a queue pointer 81 with respect to the 4 KB real page allocated to this job. The connections of these entries are the same as those of the unallocated 4 KB region queue 710 (FIG. 4A).

FIG. 5B represents an allocated split region queue 820 for a certain job. This queue 820 is arranged by a series of an entry 51D of the table 50 and a queue pointer with regard to the split region allocated to this job.

Figure 5C:
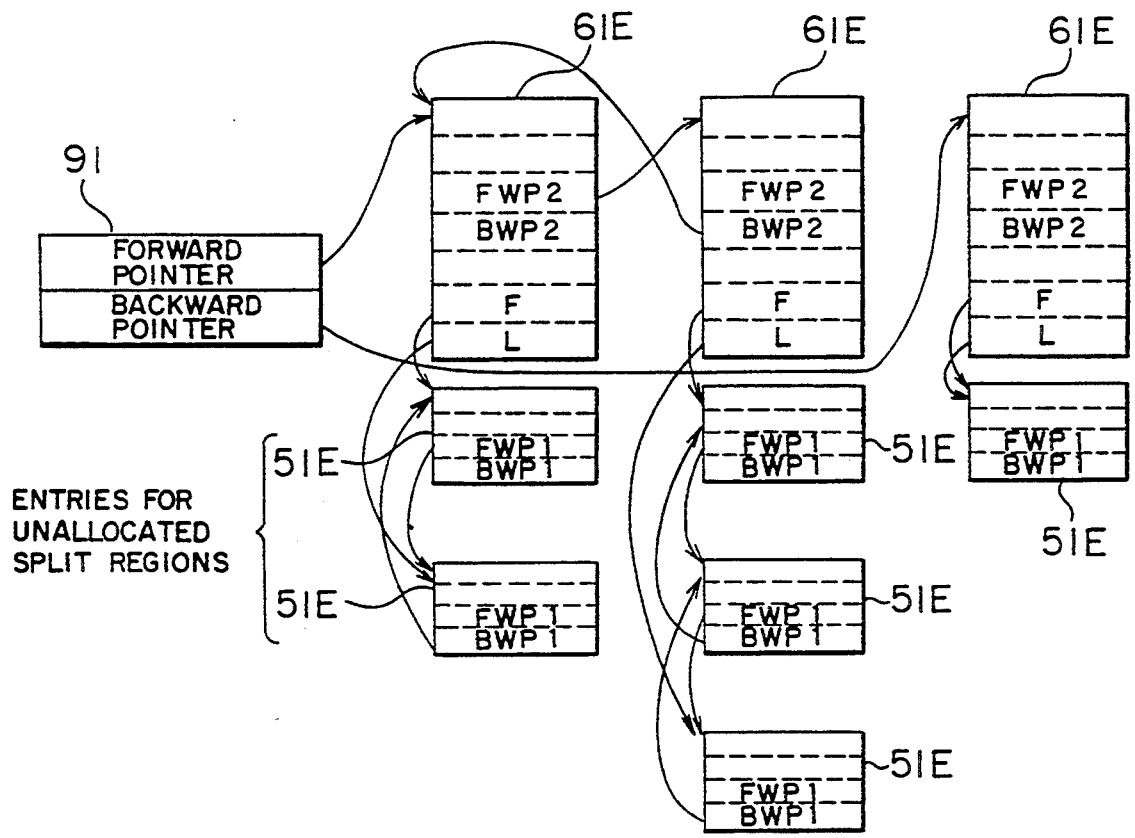

FIG. 5C illustrates a partially allocated 64 KB page queue 910 for a certain job. This queue is formed by a series of an entry 51E and a queue pointer 91 of the table 50 for the unallocated split region within the respective pages in which, although a part of split region has been allocated to this job, other parts of a split region have not yet been allocated to the 64 KB page. The connections of these entries 61E and 51E are the same as those of the unallocated 64 KB page queue 810 (FIG. 4B).

It should be noted that in a 64 KB partially used page queue pointer 102 of a job management table 100, an address of a lead entry for a series of the entry 61 and also an address of an end entry thereof are set as a forward pointer 102A and a backward pointer 102B, respectively. An unallocated split region among the 64 KB pages, which is being used by a certain job, can be readily detected from this queue 910.

The queues 810, 820 and 910 denoted in FIGS. 5A to 5C are similarly provided with other jobs. For the sake of simplicity, these queues are omitted.

Figure 5D:
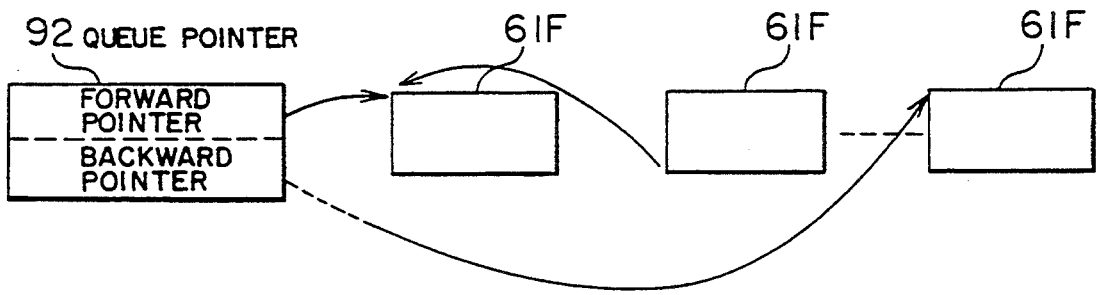

In FIG. 5D, there is shown an entirely allocated 64 KB page 920 for a certain job. This queue is formed by a series of an entry 61F for a table 60 corresponding to a 64 KB page the split regions of which have been allocated and which has been allocated to this job, among the 64 KB pages. This queue 920 is used by a page measurement program 3 (to be discussed later). Since this queue 920 is different from the above-described partially split queue 910 and all of the split regions thereof have been used, the entry series of the table 50 with respect to these split regions are not connected. The entries for these split regions are connected to the above-explained allocated split region queue 820.

Subsequently, an operation of a real storage allocation program 2 will now be described.

Figure 6:
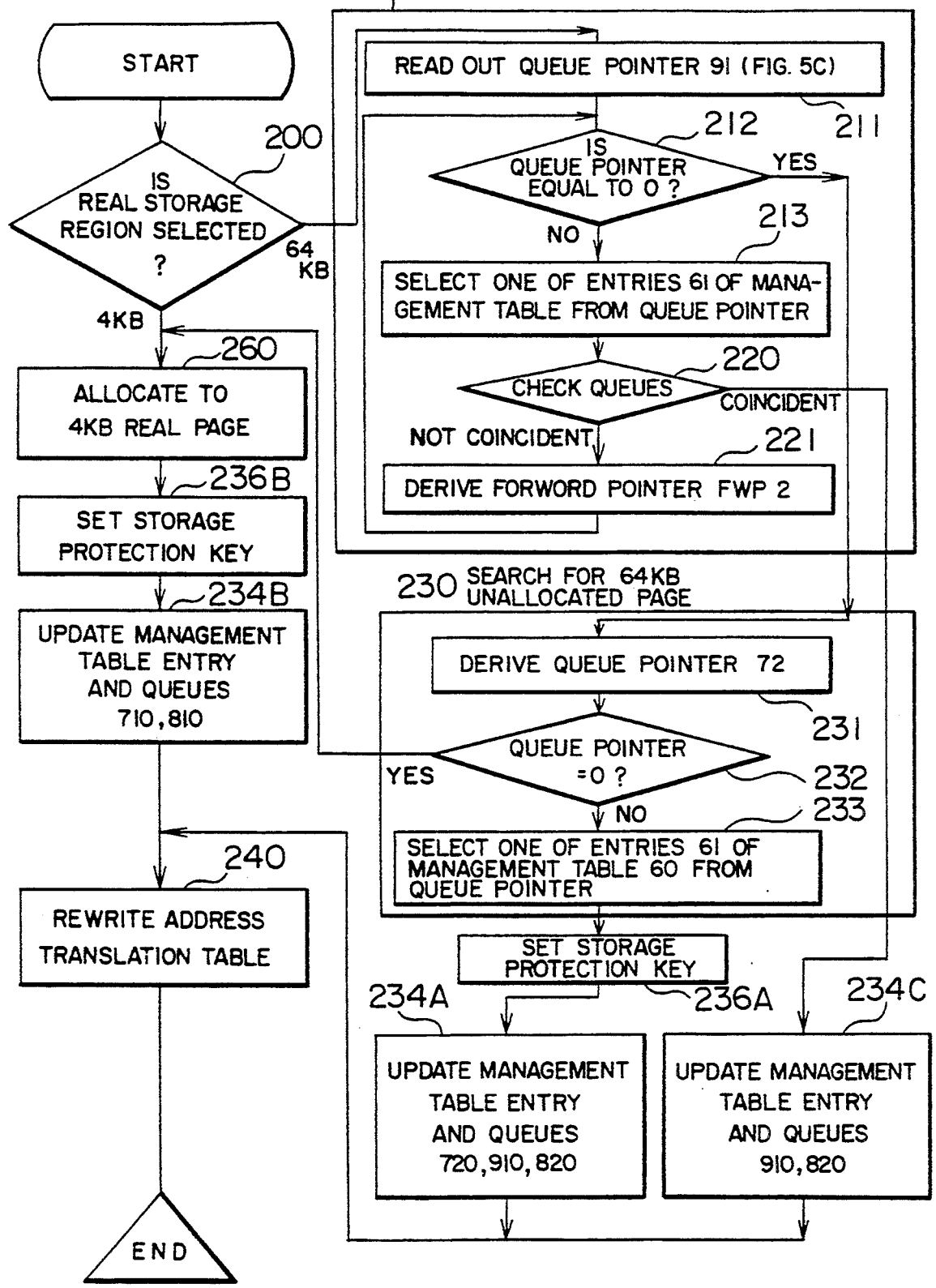
FIG. 6 is a process flowchart for a page allocation program or real storage allocation program in the first preferred embodiment.

In FIG. 6, there is shown a schematic flow of the real storage allocation program.

Figure 15A:
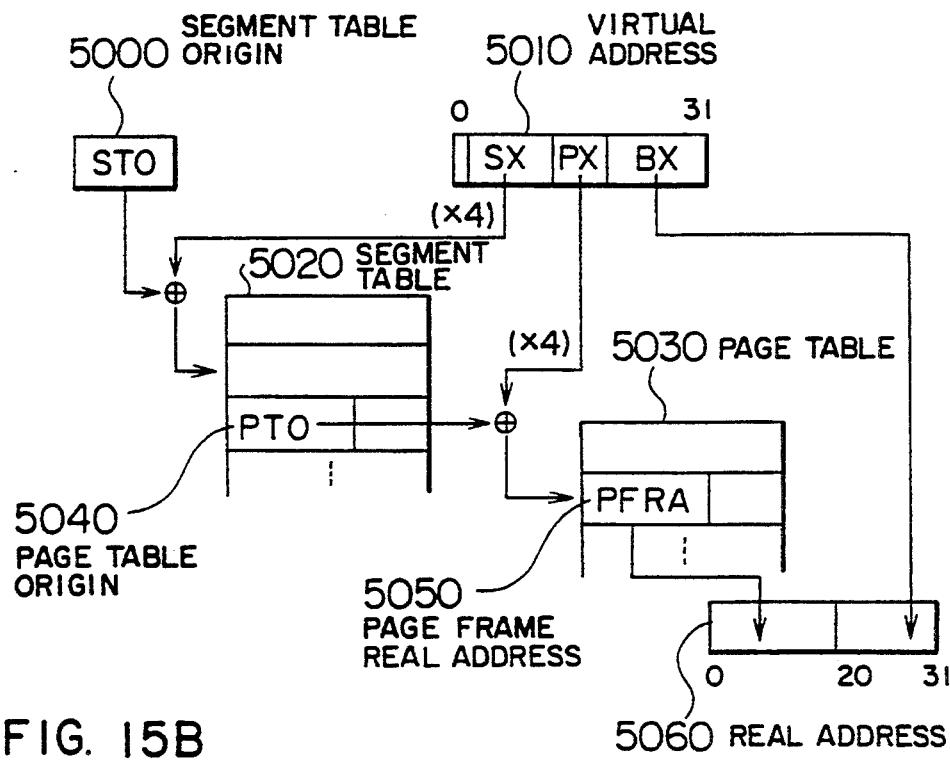
FIG. 15A schematically illustrates address translation in prior art.
Figure 15B:
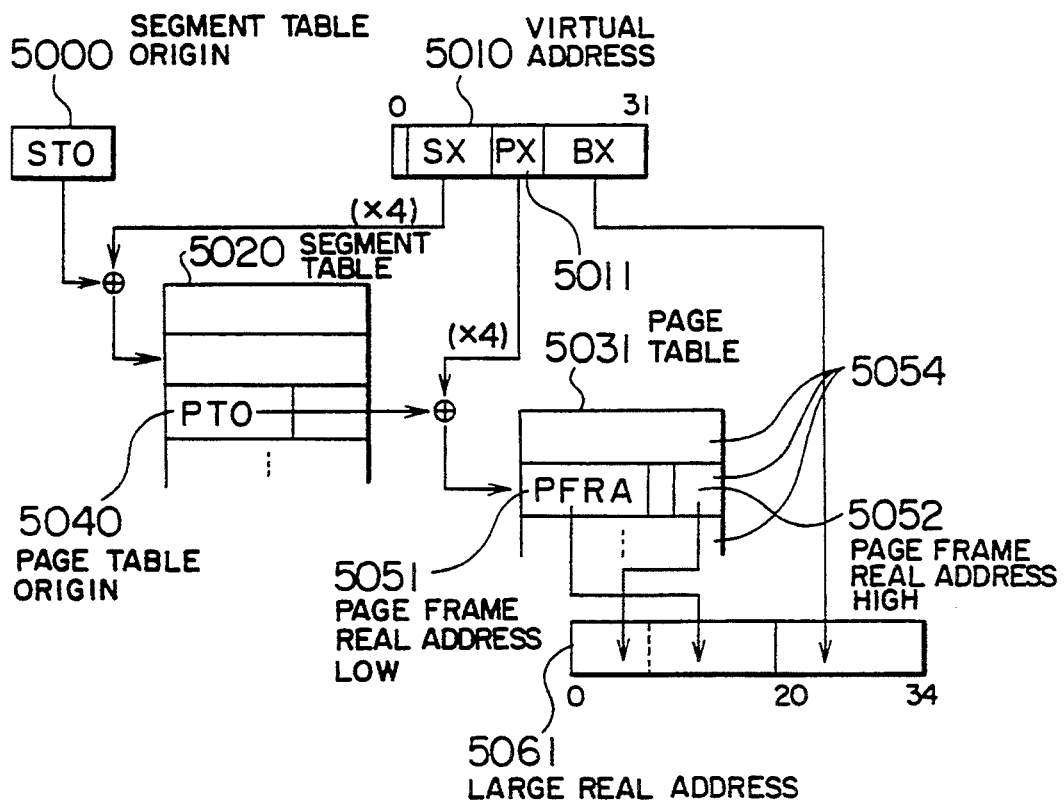
FIG. 15B schematically illustrates address translation according to the first preferred embodiment.

Before describing this operation, an address translation mechanism used in this preferred embodiment will now be summarized. FIG. 15A schematically represents a conventional method of a basic address translation process which has been described in IBM's (International Business Machines Corporation) manual "IBM Enterprise Systems Architecture/370 Principles of Operation SA22-7200-0", pages 3–29. On the other hand, FIG. 15B schematically illustrates an address translation used in the preferred embodiment of the present invention. The feature of this preferred embodiment is a real storage capacity greater than a virtual storage capacity, as described as one of the features related to FIG. 1. That is to say, the bit length of PFRA 5050 in the conventional method shown in FIG. 15A must be expanded. In accordance with the method of the present invention, the entry length of each of the entries 5054 in the page table 5031 remains at the same entry length of the conventional method, the upper portion of the real storage address is stored by utilizing the empty bit present in the real portion of this entry 5040. In other words, although the real storage address is held by the continuous bit in conventional PFRA 5050, the upper portion of the real storage address is held by 5052 shown in FIG. 15B and the lower portion of the real storage address is held by 5051 which is similar to that of the conventional method. Although the entry length of the respective entries 5054 may be expanded in conformity to the maximum packaging quantity of the real storage, since this table entry number depends on the accumulated value of the executed job number and also the maximum value (e.g., 2 GB) of the virtual capacity, the above-described method is employed. This is because a large quantity of virtual storages and real storages are occupied by this operation even when several bits per entry are expanded. On the other hand, STO 5000 and PTO 5040 hold addresses of the respective segment table and page table for the real storage. Since the total capacity of the respective tables is small, if they are formed on the conventional region (for instance, an address less than 2 GB) for the real storage, it is not required to expand the entry length. As previously described, it differs only in that the upper portion of the real address is held at the empty bit 5052 on the entry 5054 of the page table according to the present invention, as compared with the conventional method. As a result, regarding the address translation process executed by the hardware, the real address 5061 shown in FIG. 15B is fetched by the upper address portion 5052 and lower address portion PFRA 5051 of the page table entry 5054, which is different from the conventional method. Other operations are the same as those of the conventional method.

In the page allocation program 2 of this preferred embodiment, PTO 5040 is set to the respective entries on the segment table having such a structure, and also the real page addresses 5052 and 5051 are set to the respective entries on the page table, the entry in question is processed by the address translation and this process is represented by the real page allocation (or, merely page allocation). In case of the preferred embodiment, precisely speaking, the real page address implies both the lead address of the 4 KB page 21 for the real storage 10 and the lead addresses of the respective 4 KB split regions inside the 64 KB page 31.

A description will now be made of the operation of the page allocation program 2. As previously stated, since the memory capacities of the segment table 5020 and page table 5031 are small, these tables themselves are formed on the real storage region within the conventional real storage packaging range. Furthermore, if these tables are formed only on the real page having the conventional size (4 KB), it can be readily understood that the execution can be achieved by the same process as that of the conventional method. As a consequence, this operation (i.e., formation of the segment and page tables) will be omitted in the following description, and thus the following description is made how to split and manage the 64 KB real page and also how to allocate the pages to every split page, which constitutes a feature of the present invention. It should be noted that both setting the real page addresses 5052 and 5051 into the above-described page table entry 5054 and setting valid/invalid bits (not represented in figures) of this entry are expressed as an "address translation table rewrite" (for instance, a step 240 shown in FIG. 6).

In case a certain region on a virtual storage is accessed during an execution of a certain program (job) and a real storage region corresponding to this virtual region has not yet been allocated, a page fault interrupt occurs and, in response thereto, a demand for allocating a real storage also occurs by which the real storage region is allocated to the virtual region in a unit of a virtual page, and furthermore the real storage allocation program 2 is initiated. Once the real storage allocation program 2 is initiated, a selection is first made of the region on the real storage to be allocated at a real storage selection step 200.

In accordance with this preferred embodiment, when a region belonging to a real storage to be allocated has been previously designated to either the 4 KB page region 20 or 64 KB page region 30, this designated region is selected. In other cases, the 64 KB page region is first selected. As will be discussed later, a search is made of 4 KB unallocated regions in this region 30. If no unallocated region is found out, a real storage located within the 4 KB page region 20 is to be allocated. When the 64 KB page region 30 is selected by the real storage region selection step 200, a search 210 in a 64 KB demanding job allocated page is performed. This process is employed so as to utilize a partially unallocated split region in the 64 KB page, which is produced when the 64 KB page is split to be used. The unallocated split region located in the 64 KB page partially allocated to the demanding job is allocated to the job with having priority.

When a demand for allocating a real storage is first made from a job, there is no 64 KB page partially unallocated to this job. As a consequence, since the search 210 fails, a description will be made of this search 210 later. If a partially unallocated page cannot be found out by the search 210, then a 64 KB unallocated page search 230 is executed and one split region present in the 64 KB unallocated page. That is to say, by employing the 64 KB unallocated page queue 720 (FIG. 4B), a 64 KB unused page to be allocated to this job is found. To this end, a pointer 72 of this queue 720 is picked up at a step 231, first of all, and a judgement is made whether or not the pointer value is equal to zero at a step 232, whereby a check is made whether or not there exists an entry 61B connected to this pointer.

If the queue pointer 72 is not equal to zero, the lead entry 61B of the queue 720 connected thereto is picked up at a step 233. A selection is made of a lead entry of a series of the entry 51B with respect to 16 split regions connected to this entry 61B, and then the corresponding split regions are used as objects to be allocated. Subsequently, both a management table entry and a queue are updated at a step 234A. In other words, a selection is performed to the entry 51B connected to the entry 61B which is indicated by the internal forward pointer (F) (FIG. 3B) of the entry 61B, both the address of the virtual page to be allocated and ID (identifier) of the job for demanding an allocation are set into the fields 91A and 92 (FIG. 3A) thereof, the number of an unallocated split region within the selected entry 61B is increased by 1 (an initial value thereof is equal to "0"), and also the job ID of this job is set into the field 92B.

Next, a queue maintenance, or updating operation is carried out as follows. That is to say, both the above-described selected entry 61B and 16 entries 51B connected thereto are left out from the unallocated 64 KB page queue 720 (FIG. 43), and 15 entries (i.e., entries of the table 50 with respect to the unallocated split region) other than the above-described selected entry 51B among this entry 61B and 16 entries are connected to the 64 KB partially allocated page queue 910 (FIG. 5C) employed to this job. Furthermore, the selected entry 51B is connected to the allocated split region queue 820 (FIG. 5B) employed for this job.

Subsequently, the storage protection key (in case no designation is clearly made from the job, a program key value of this key at this time) which has been designated to the virtual page allocated at the step 236A, the same key value as the value set in the field 97 is set to the entry 6 of the key storage 5 (FIG. 1) corresponding to the 64 KB real page contained in the split region to be allocated. It should be understood that the address of this 64 KB real page may be determined by checking whether or not the selected entry 61B corresponds to the entry in the table 60 (namely, the table entry of this entry 61B thus determined indicates the page address of the real page by the page number). Based upon this 64 KB real page address, the above-described storage protection key is written by employing the hardware instruction. As previously stated, the writing operation of this storage protection key is executed only when the split region is allocated from the 64 KB unallocated page at first.

Also, this storage protection key is read out by the hardware every time any of the split regions corresponding to the 4 KB virtual page contained in this 64 KB real page is accessed, and is compared with the storage protection key which has been attached to the access demanding program at this time, so as to be utilized for checking whether or not the access operation is available. In accordance with this preferred embodiment, since such a method is employed to access the storage protection key corresponding to the accessed real page even when there are the split regions by the known method, there is an advantage that the hardware for accessing the storage protection key may be similar to that of such a case where no split region is used.

Next, both the real address of the selected split region and the validation of this entry are performed on the entry within the address translation table corresponding to the virtual page in which the real storage allocation has been demanded at a step 240. Thus, this real storage region is brought into a usable condition. As a result, the allocation of the first split region within the 64 KB unallocated page is completed.

If the queue pointer (72) is equal to zero at the search 230 in the above-described process, a judgement is made that there is no 64 KB unallocated page. Then, one unallocated real page within the 4 KB real page region 20 of the real storage 10 is selected as a real storage region to be allocated at a selection process 260 for the 4 KB page.

This selection is performed by selecting one entry 51A connected to the 4 KB unallocated page queue 710 (FIG. 4B). Both ID of the allocation demanding job and the address of the virtual page to be allocated are written into this selected entry 51A. Furthermore, this entry 51A is enqueued from the above-described queue 710, and then dequeued to the 4 KB allocated page queue 810 (FIG. 5A) employed for this job. Subsequently, the setting operation of the storage protection key is carried out at a step 236B, which is similar to that of the step 236A, and then the rewriting operation of the address translation table is performed at a step 240, which is similar to that of the previous step. Thus, the allocation to the 4 KB real page is accomplished. Thereafter the similar process is carried out every time the real storage allocation is newly made for the virtual page. At this time, the search 210 for the 64 KB allocated page of the demanding job is also executed, a detail of which has been omitted. Then, this page search will now be described more in detail.

At a step 211, the queue pointer 91 of the 64 KB partially unallocated page queue 910 (FIG. 5C) with respect to this job is read out, and a judgement is made whether or not the value of this queue pointer 91 is equal to zero at a step 212. If this value is equal to zero, a decision is made that there is no 64 KB partially unallocated page. The process is advanced to the above-described 64 KB unallocated page search 230.

To the entry, if this queue pointer 91 is not equal to zero, then a selection is made of the head entry 61E connected to this queue pointer 91, and a comparison is performed between the storage protection key 97 (FIG. 3B) of the lead entry 61E and the storage protection key of the virtual page to be allocated at a step 220. If the coincidence is established, then a judgement is made that the allocation can be made. If these storage protection keys are not coincident with each other, the forward pointer FWP2 within this lead entry 61E is taken out at a step 221 as a new pointer. The operations defined from the step 212 to the step 221 are repeated until the forward pointer FWP2 in the succeeding entry 61E becomes zero, or the entry 61E where the storage protection keys are coincident with each other at the above-described step 220 is found out. Any of the 64 KB pages indicated by this page queue 910 is such that a portion of the partial region has been allocated to the demanding page allocation job at this time. If there exists the 64 KB real page having the storage protection key coincident with the storage protection key of the virtual page to be page-allocated at this time in this partial allocated page queue, one of the split regions within this 64 KB partially allocated page is selected as a real storage region to be allocated. If the above-described selection is performed, even under such a condition that only one key storage entry is given to the 64 KB real page, there is no problem even when this page is split, or subdivided into the split region so as to be allocated to the job. When there is coincidence in the storage protection key within one entry 61E of the 64 KB partially allocated page queue at the step 220, as previously described, both this entry and queue are updated at a step 234C. That is to say, one selection is made of the entry 51E of the unused split region connected to this entry 61E, and both the job ID and the address of the virtual page to be allocated are set to this selected entry 51E in order that the split region corresponding to this entry is used as an allocation region. Furthermore, the number 96 of the allocated split regions located in the above-described entry 61E is increased by 1.

The above-described entry 51 is dequeued from the above-described queue 910 and enqueued to the allocated split region queue 820 provided to this job. If the number of the allocated split regions which have been updated is equal to 16, this implies that there is no unallocated split region in the 64 KB real page containing such a split region to be allocated. As a result, the above-described entry 61E corresponding to this 64 KB real page is enqueued from the queue 910, and then dequeued to the entry 61F as an all allocated queue 920 (FIG. 5D).

When the process defined at the step 234C is completed, then a process defined at a step 240 is similarly performed. The above-described process may be repeated every time the real page allocation demand is made. As a consequence, even when only the real page size is expanded while maintaining the virtual page size at the 4 KB as same as in prior art, the memory capacity of the key storage (5) may be reduced with employment of only one entry 6 on the key storage 5 (FIG. 1) in regards to the 64 KB real page. Moreover, the real storage region may be allocated to the virtual page at a higher efficiency without producing any losses (i.e., any loss caused by the fragmentation) in the real storage by allocating the real storage regions to the unallocated split regions on the 64 KB partially allocated real page with priority.

Figure 7A:
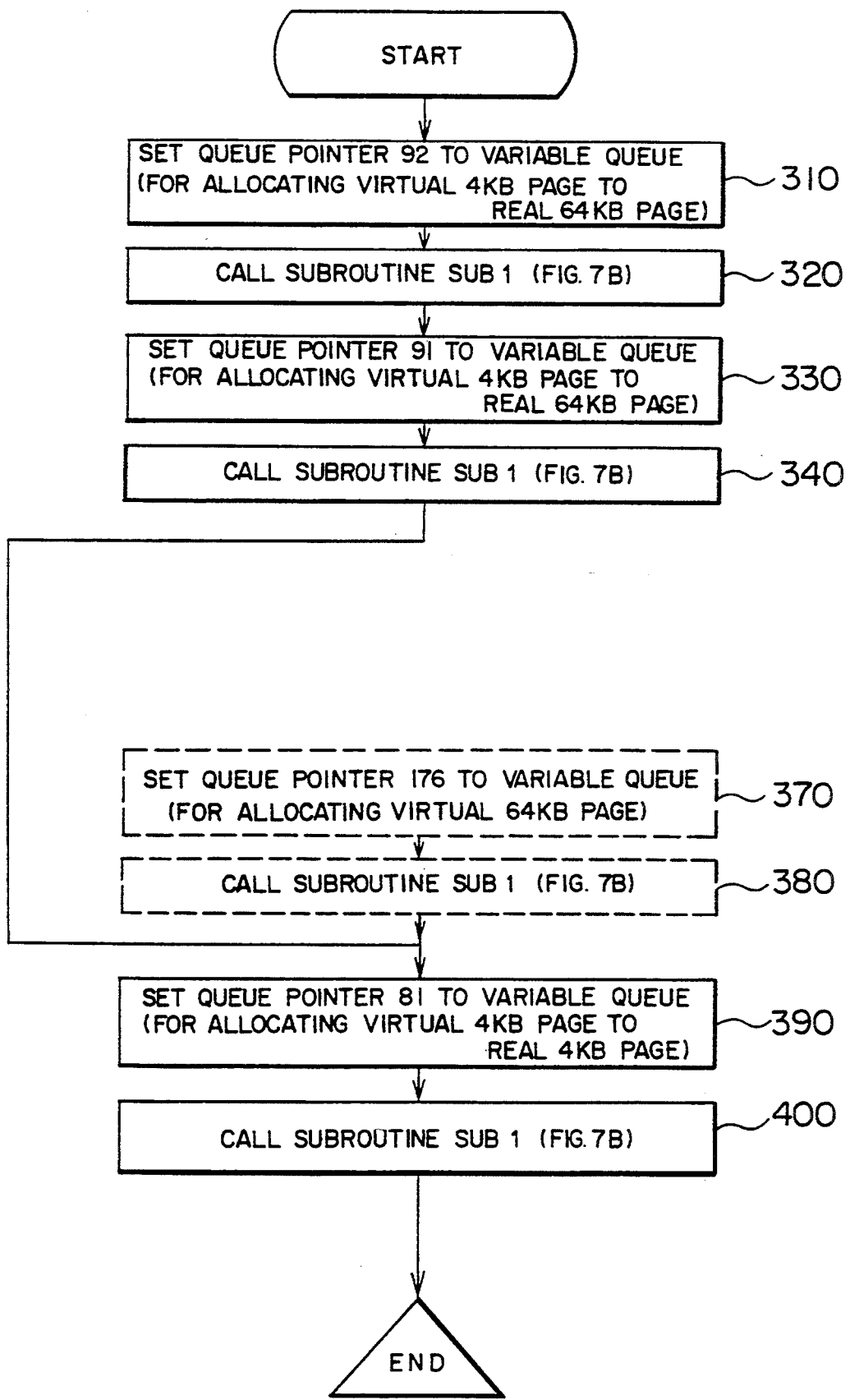
FIGS. 7A and 7B are process flowchart for page measurement programs according to first and second preferred embodiments of the present invention.
Figure 7B:
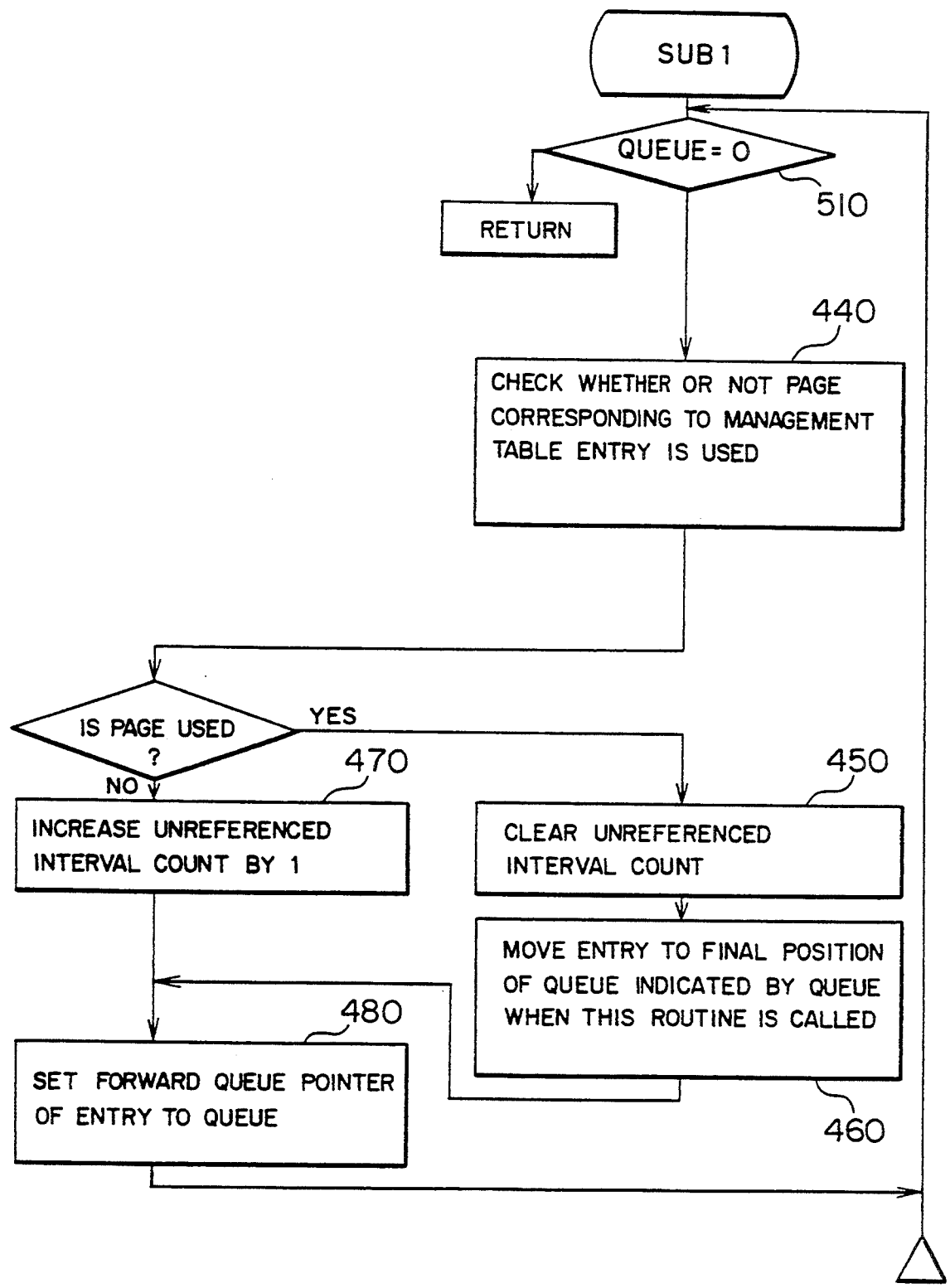

Next, an operation of the page measurement program 3 (FIG. 2) will now be described. FIGS. 7A and 7B are schematic flowcharts of the page measurement program 3.

It should be noted that steps 370 to 380 denoted by dot lines are not used in the present embodiment, but used in a second preferred embodiment (to be explained later).

Before describing the operations of the page measurement program, an aim of this page measurement will now be summarized. The page measurement is such a process that in order to determine a page which should be paged out when a real storage is lacking in use, a use frequency of the page allocated to each job every time the respective jobs under execution utilize a certain CPU, is previously checked. As a result, this page measurement program 3 is initiated at a certain time interval.

A feature of the page measurement process according to this preferred embodiment is such that when the sizes of both the virtual page and the real page to which the real storage allocated to this virtual page belongs are different from each other, the page measurements are carried out for each of the regions where the sizes of the virtual page and of the real page thereof are great.

That is to say, in case that the 64 KB page has been allocated to some of the virtual pages, when any of the 16 split regions of the real page thereof are used, the page measurement is performed as if this real page were utilized. In other words, with respect to the 4 KB virtual page allocated to the 64 KB page region 30, the allocated split region queue 820 (FIG. 5B) is not used, but the page measurements are performed at a unit of 64 KB, namely of the entry 61 of the table 60 connected to the queues 910 and 920 by employing the 64 KB partially allocated page queue 910 (FIG. 5C and also the 64 KB all allocated page queue 920 (FIG. 5D).

The page measurement will now be described more in detail. As represented in FIG. 7A, at a step 310, a lead pointer 92 of the 64 KB all allocated page queue (FIG. 5D) 920 employed for a job to be page-measured is set to a variable QUEUE, and an internal subroutine SUB1 is called at a step 320.

This queue 920 corresponds to one of such queues representing the entry of the table 60 with respect to the 64 KB real page allocated to the 4 KB real page to which the 4 KB virtual page has been allocated, and all of the split regions within the above-described 64 KB real page indicates the 64 KB allocated page. When the subroutine SUB 1 is called, a check is made whether or not there is an entry 61F to be page-measured by knowing whether or not the value of the variable QUEUE is equal to zero at a step 510.

Subsequently, if there is an entry thereto, another check is made whether or not the 64 KB real page corresponding to the entry 61F instructed by the variable QUEUE is used at a step 440. This is executed by reading out the reference bit (R7) on the key storage entry 6 shown in FIG. 1 in response to the hardware instruction. The reference bit R7 is set by the hardware when the page corresponding to this key storage entry is accessed, and reset in response to the above-described hardware instruction after the instruction is executed. If these reference bits are equal to zero, it can be understood that this page has not been used from the previous page measurement time instant until the present page measurement time instant. Then, if this page is used, the unreferenced interval count 93A (FIG. 3B) is cleared at a step 450 (namely, the unreferenced interval count 93A is set to zero). At a step 460, this entry 61F is moved to a final point of this queue (i.e., the queue for setting the queue pointer to the variable QUEUE when the SUB 1 is called, the queue 920 (FIG. 5D) in this case). This entry movement is required so as to construct the queue in the order from the greatest unreferenced interval count 93A to the smallest unreferenced interval count. With such an operation, when the queues are sequentially paged out from the lead queue to the end queue, the queues having the low use frequencies may be automatically paged out in the page out program 7 (will be discussed later). Next, if this page is not used, the unreferenced interval number is counted up at a step 470. As previously stated, a use frequency of a page indicates that the larger this unreferenced interval count, the lower this use frequency. This is because the unreferenced interval count is counted up every page measurement interval when this page is not used, and also the unreferenced interval count is set to zero when this page is used.

Subsequently, a forward pointer (FWP2) 94B in the entry 61F under process is set to the variable QUEUE at a step 480, and the above-explained processes defined at the steps 510 to 480 are repeated for a new entry 61F until the value of the variable QUEUE becomes zero, in other words, all of the entry 61F connected to the queue 920 have been processed. With the above-described process, the page measurement has been executed in the unit of 64 KB with respect to the virtual pages dequeued to the 64 KB all allocated page queue 920 (FIG. 5D) among the 4 KB virtual page which has been allocated to the 64 KB page region 30.

Next, to perform the page measurement in unit of 64 KB with regard to virtual pages dequeued to another 64 KB partially allocated page queue 910 (FIG. 5C) within the 4 KB virtual image which has been allocated to the 64 KB page region 30, a pointer 91 representative of a lead entry 61E of the variable QUEUE is set to this variable QUEUE at a step 330, and the internal subroutine SUB1 is called at a step 340. In accordance with the subroutine SUB1, the page measurement process for the entry 61E dequeued to the above-described page queue 910 is executed in unit of 64 KB by repeating the above-described processes, as defined from the step 510 to the step 480, with respect to the entry 61E dequeued to the above page queue 910. With the above-described operations, the page measurement of the jobs allocated to the 64 KB page region 30 has been completed. Thereafter, the page measurement is performed to the 4 KB virtual page allocated to the 4 KB page region 20. In this case, the above-described page measurement process is executed in a unit of 4 KB. All of the 4 KB virtual pages which have been to the 4 KB page region 20 are dequeued to the 4 KB allocated page queue 810 (FIG. 5A). Also in this case, a pointer 81 indicative of a lead entry 51C of this queue is set to a variable QUEUE at a step 390, which is similar to the previous process. At a step 400, an interval subroutine SUB 1 is called. In this subroutine SUB1, the page measurement process for an entry 51C dequeued to the 4 KB allocated page queue 810 is performed in a unit of 4 KB by repeating processes defined by 510 to 480, which is similar to the previous process. The above-described process may be carried out every time the job under execution utilizes CPU for a predetermined time period. As a result, the page measurement process may be executed in the unit of the real page size of the real storage which has been allocated to this virtual page while the virtual page size remains at the conventional 4 KB, so that the page measurement number may be lowered.

Figure 13A:
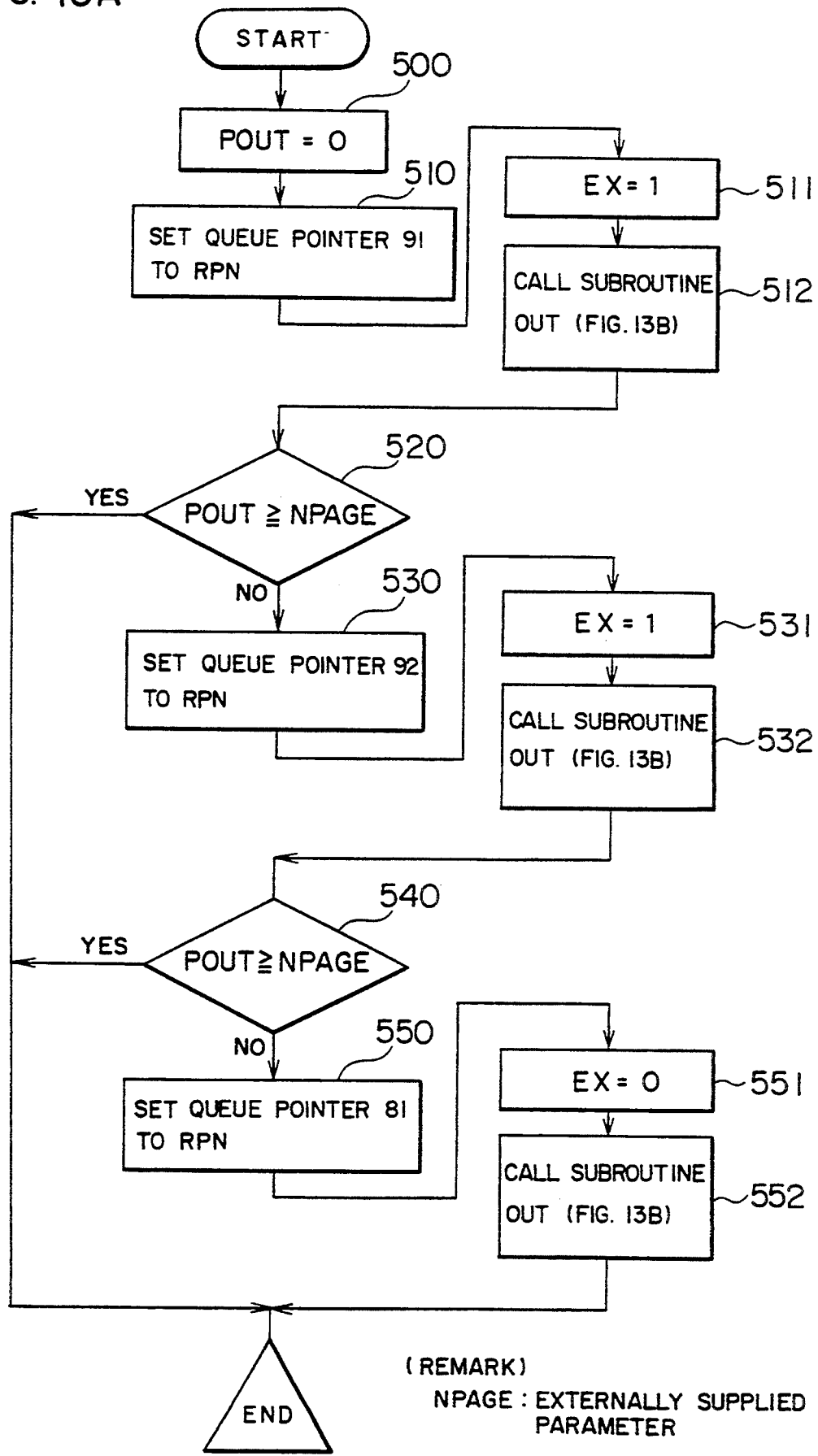
FIGS. 13A and 13B are process flowcharts for a page out program in the first preferred embodiment.
Figure 13B:
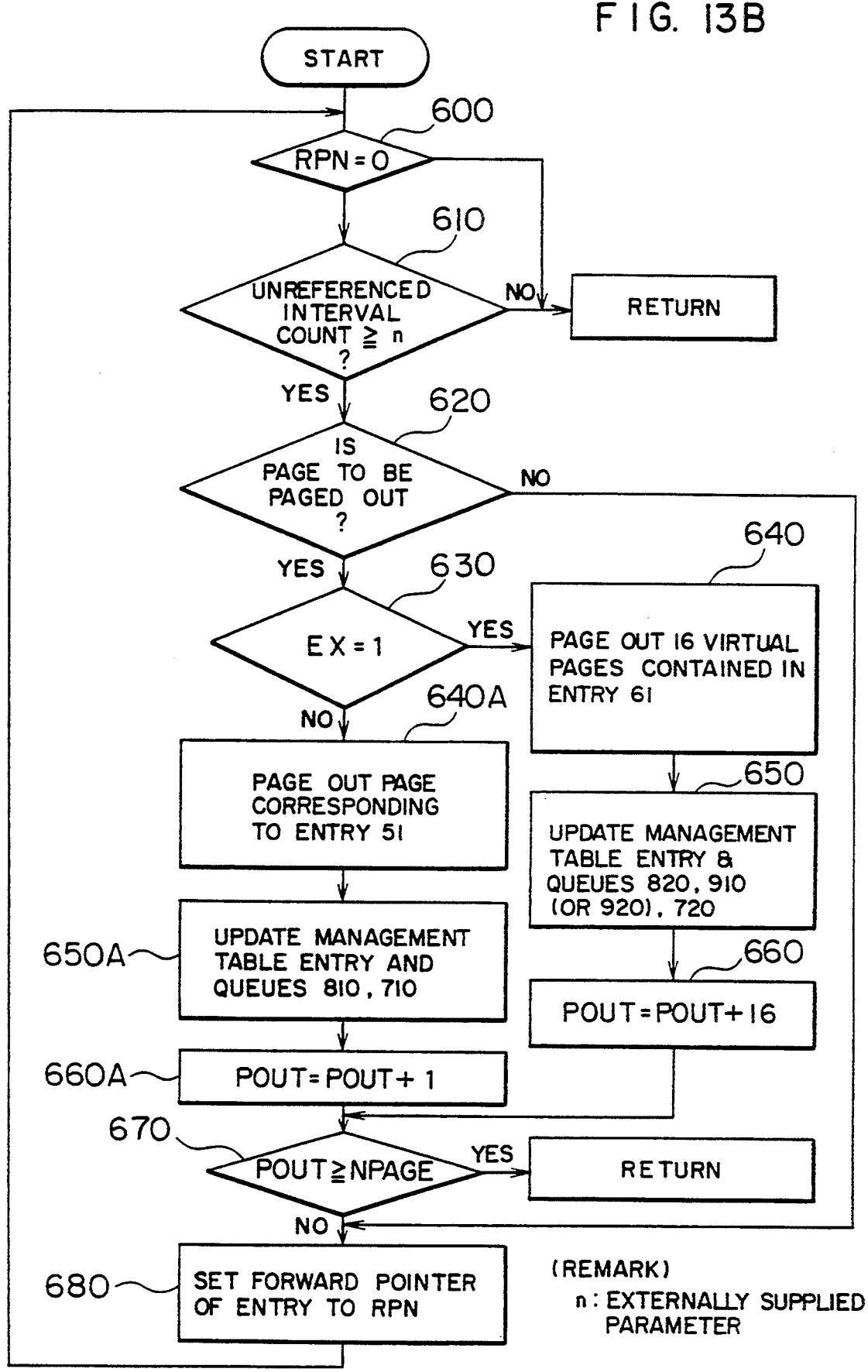

Then, an operation of the page out program 7 (FIG. 2) will now be explained. The "page-out" described in this preferred embodiment implies that, based upon the page measurement result made by the above-described page measurement program, the real storage regions which have been allocated to the virtual pages are successively released from the virtual page having the low use frequency, and then the contents of the real storages are output to the auxiliary storage apparatus. It should be noted that the contents of the real storages are not always output to the auxiliary storage apparatus, namely are not output in the following case. That is to say, a page to be paged-out has been paged-out also in the previous case, and the present content of this page is the same as the content of the page when it was paged-out before. In other words, when the change bit C (reference numeral 9 represented in FIG. 1) of this page is OFF, then no storage content is output to the auxiliary storage apparatus, but only the real storage region is released. These processes are referred to as the "page-out" in this preferred embodiment. FIGS. 13A and 13B are schematic flowcharts of the page out program 7. The feature of the page out program process according to this preferred embodiment is such that when a size of a virtual page is different from a size of a real page to which a real storage allocated to this virtual page belongs, the page out is executed in a page size corresponding to a larger size of one of the virtual page and real page. That is to say, the virtual page group which has been allocated to the 16 split regions on the same 64 KB real page within the 64 KB page region 30 is wholly page out processed. With such a page out process, the process overhead may be reduced. Referring now to FIGS. 13A and 13B, the page out process will be described more in detail. It should be understood that this page out program 7 is initiated once regions where the real storage is usable are less than a predetermined quantity, and also the program 7 is initiated so as to page-out N ("N" being an externally supplied parameter) pieces of the pages whose unreferenced interval counts are more than a predetermined count "n." When the page out program 7 is initiated, a variable "POUT" for counting the page number which has been paged out is set to zero at a step 500. Subsequently, at a step 510, a lead pointer 91 of the 64 KB partially allocated page queue 910 (FIG. 5B) which has been employed for the job to be paged out, is set to a variable "RPN"; "1" is set to a variable EX at a step 511, in order to indicate the queue of the page allocated to the 64 KB page region; and then the internal subroutine OUT is called at a step 512. When the internal subroutine OUT is called, a check is made whether or not there is the entry 61E to be paged out by checking whether or not the value of the variable RPN is equal to zero at a step 600. If no entry exists, no process is performed and is returned. To the contrary, when there exists the entry, a judgement is performed whether or not the unreferenced interval count of this entry 61E is higher than the number n instructed when the page out program is initiated. If this unreferenced interval count is smaller than n, that of the subsequent entry 61E is similarly less than n since the respective entries are successively arranged in the order from the largest unreferenced interval count to the smallest one. Accordingly, since no page for satisfying the page out initiation condition at this time exists in this queue, this process is returned.

Conversely, if the unreferenced internal number is greater than n, a check is made whether or not it corresponds to a page permitted to be paged-out at a next step 620. This check corresponds to such a conventional check normally executed in the conventional virtual storage type computer that the page out of this page is prohibited (being page-filed), or it is under page out operation at the previous page out process. If the page out is not allowed, to process the next page dequeued to the queue, a forward pointer 94B of this entry 61E is set to the variable PRN at a step 680, and then the processes defined from the step 600 are repeatedly performed. At a step 620, if the page capable of being paged out is found out, a check is made of the value of the variable EX at a step 630. In this case, since "1" has been set to the variable "EX", a judgement is made that it corresponds to the process in the unit of 64 KB, and the process is advanced to a step 640. At this step 640, all of the split regions contained in this entry 61E are paged out (note that, as previously described, the content of this split region is not transferred to the auxiliary storage when the change bit "C" (reference numeral 5 shown in FIG. 8) on the key storage corresponding to this entry 61E is brought into "off"). Furthermore, the entry 5054 (FIG. 15B) of the address translation table corresponding to the virtual pages which have been allocated to the respective split regions is invalidated.

Figure 17:
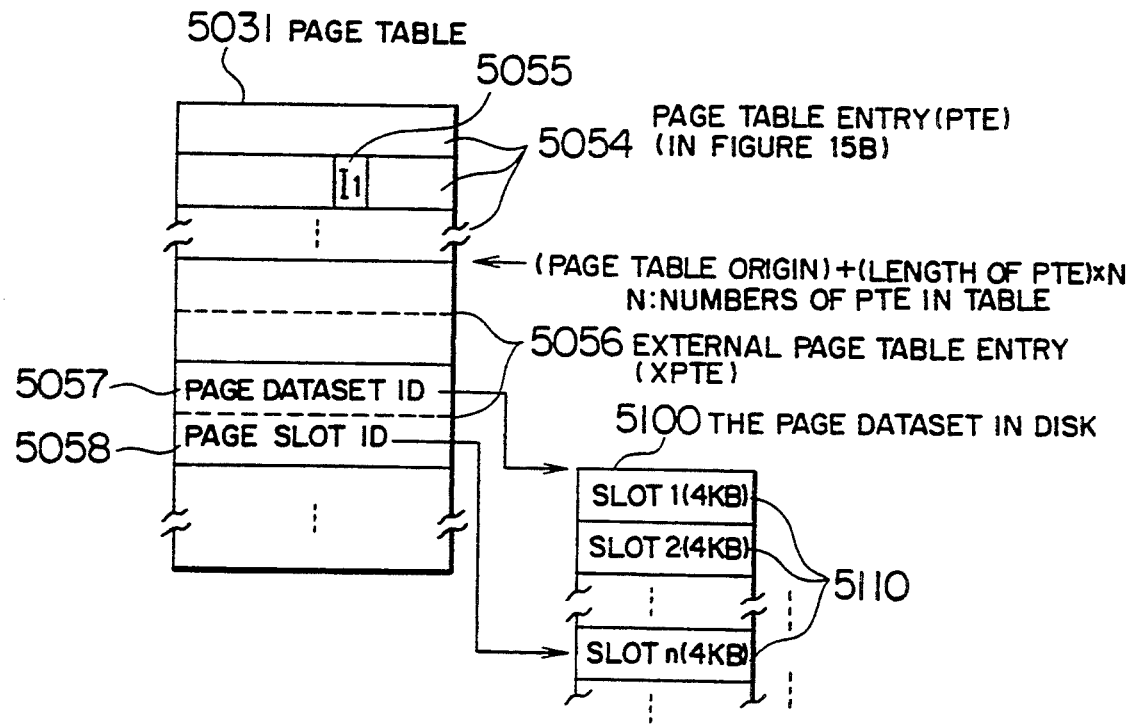
FIG. 17 schematically represents a management of a "page dataset" according to the first preferred embodiment.

Subsequently, the above-described page out process will now be described more in detail with reference to FIG. 17. First of all, a description will now be made of the conventional page out processing method normally executed in the conventional virtual computer system employing the auto-demand paging method. In FIG. 17, there is shown how to manage both the page table 5031 (FIG. 15B), i.e., one of the address translation table which has been described in the preamble of the operation explanation for the page allocation program 2, and the page to be paged out (information on the page). The page table 5031 is constructed of, as represented in FIG. 17, a page table entry 5054 group (referred to as a "PTE" group) and also an external page table entry 5056 group (referred to as a "XPTE" group) for managing, therein, the paged out page which is present on an auxiliary storage apparatus (for instance, a magnetic disk apparatus). In the PTE 5054, there is an invalid bit $I_1 5055$ (simply referred to as an "$I_1 5055$") indicating whether or not the entry in question is valid. When this $I_1 5055$ is ON, then the real page addresses 5052 and 5051 (FIG. 15B) on this PTE 5054 are invalid. The position on the auxiliary storage is managed by XPTE 5056 at the place where there exists an entry of the virtual page corresponding to this PTE 5054. It should be noted that each of the entries for the PTE 5054 group and XPTE 5054 group are in 1:1 correspondence with page index (PX) 5011 of the virtual address 5010 (FIG. 15B). In other words, in the XPTE group similar to the PTE group, the entry addresses corresponding to this virtual page are calculated by the above-described page index (PX) 5011 with the lead of the XPTE group as a starting point. Assuming now that the entry length of the PTE is "$LENGTH_p$"; the entry length of the XPTE is "$LENGTH_x$"; the virtual page number contained in a single page table 5031, namely the entry number is "N"; and also the lead address of this page table (5040 shown in FIG. 15B) is "PTO", the entry addresses may be calculated as follows:

$$PTO + (LENGTH_p \times N) + (PX \times LENGTH_x).$$

Subsequently, the management for the paged-out page will now be explained. In general, a file on the auxiliary storage employed for the page out process is called a "page dataset 5100." As shown in the figure, this page dataset 5100 is subdivided into a region (SLOT 1 to $SLOT_n$) 5110 group named as a slot having the same size as the virtual page size. Normally, there are plural page datasets 5100. These page datasets are managed in such a manner that the position of the paged-out page is stored in the XPTE 5055; information indicating that the page has been output to which page dataset is stored in the page dataset number 5057; and information representing which slot on this page dataset has been output is stored into the page slot number 5058. Also, with respect to the slot output when the page is outputted, each slot 5110 of the page dataset 5100 is managed by way of a so-called "bit map management method" in which a single slot corresponds to a single bit, so that the unused slots can be found out by checking the ON/OFF state of the respective bits present in this bit map, and one of these unused slots may be employed. As previously stated, the major process for the page out process is to set each information on the page table. In the conventional page out process, the size of the virtual page is equal to the size of the real page allocated to this virtual page, and only the real storage region is merely taken out from a single virtual page with respect to the page out (also referred to as a "page still") for a single real page, whereby only one of the above-described PTE 5054 and XPTE 5056 is processed. To the contrary, in accordance with the above-explained process step 640 (FIG. 13B) of the preferred embodiment, as apparent from the previously explained operations of the allocation process program 2 (FIG. 16), there is such a feature that the 16 (noncontinuous) virtual pages contained in the 64 KB real page are wholly processed once a single real page is paged out.

Referring back to FIGS. 13A and 13B, when the processing for all of the allocated split regions within the 64 KB real page have been completed at the step 640, this 64 KB real page is registered as the 64 KB unallocated page queue and is required to be available as an unused real storage region. Then, the following description is made of this process.

At a step 650, all of the entries 51E corresponding to the above-described respective split regions are enqueued from the 64 KB partially allocated page queue 910, are dequeued to the queues of the internal 64 KB page which is managed by the queue pointers 98 and 99 (FIG. 3B) on the entries 61E, the allocated split region number 96 (FIG. 3B) is set to zero, and furthermore the entry 61E is connected to the 64 KB unallocated page queue 720 (FIG. 4B). Subsequently, the variable POUT representative of the page out number is increased by 16 at a step 660 and is compared with the variable NPAGE for checking whether or not the variable POUT reaches the number to be paged out at a step 670. If the page out number is less than the variable NPAGE, then the forward pointer 94B of the entry 61E is set to the variable RPN at a step 680, and then the processes defined from the step 600 up to the present step are repeatedly performed. The above-described processes are completed to process all of the entries 61E of this queue at the step 600. Otherwise, this process is repeated either until the entry 61E appears having the unreferenced internal count higher than the condition when the initiation is performed at the step 610, or a predetermined page number (NPAGE) is paged out at a step 670. As previously described, the page out process is performed in the unit of 64 KB with respect to the virtual page dequeued to the 64 KB partially allocated page queue 910 (FIG. 5C) among the 4 KB virtual pages which have been allocated to the 64 KB page region 30, and the subroutine OUT is returned. Next, a judgement is made whether or not the page out process could be completed for a predetermined page number (NPAGE) at the step 520 shown in FIG. 13A. If the judgement is negative, then the virtual page dequeued to another 64 KB all allocated page queue 920 (FIG. 5D) among the 4 KB virtual pages which have been allocated to the 64 KB page region 30, is paged out in units of 64 KB. This implies that, as represented in FIG. 13A, the pointer 92 indicative of the lead entry 61F of this queue is set to the variable RPN at a step 530 "1" is set to the variable EX in order to represent that it corresponds to the queue of the page which has been allocated to the 64 KB page region 30 at a step 531, and the internal subroutine OUT is called at a step 532.

When the internal subroutine OUT is called, the previously described processes defined from the step 600 to the step 680 are repeated with respect to the entry 61F of the queue 920 in order to perform the page out process in the unit of 64 KB with respect to the entry 61F dequeued to this queue 920. It should be noted that when the queue is updated at the step 650, there is a difference in such a process for enqueuing the entry 61F from the queue 920. With the above-described processes, the page out process of this queue which has been allocated to the 64 KB page region 30 is accomplished and the internal subroutine OUT process is returned.

Thereafter, a check is again made whether or not the page out process could be finished for a predetermined page number (NPAGE) at the step 540 shown in FIG. 13A. If the determination is negative, then the page out process is executed for the 4 KB virtual page which has been allocated to the 4 KB page region 20. In this case, the page out process is executed in the unit of 4 KB. All of the 4 KB virtual pages which have been allocated to the 4 KB page region 20 are dequeued to the 4 KB allocated page queue 810 (FIG. 5A). Also in this case, the pointer 81 representative of the lead entry 51C of this queue is set to the variable RPN at a step 550, the variable EX is set as "O" in order to represent that this is the queue on the 4 KB page region 20 at a step 551, and then the internal subroutine OUT is called at a step 552, which is similar to the previous process. In this internal subroutine OUT, when the processes defined from the step 600 to the step 630 are executed for the entry 51C dequeued to the above-described queue 810, a check is made of the value of the variable EX at the step 630. In this case, "O" is set to the variable EX and thus a judgement is made of the process effected in the unit of 4 KB unit, so that the process is advanced to a step 640A. At this step 640A, the page corresponding to this entry 51C is paged out (note that when the change bit C (reference numeral 9 shown in FIG. 8) on the key storage corresponding to this entry 51C is off, no page out is executed), and thus the entry of the address translation table corresponding to the virtual page which has been allocated to this region is invalidated. Thereafter, each of the above-described entries 51C is enqueued from the 4 KB allocated page queue 810, and this entry 51C is dequeued to the 4 KB unallocated page queue 710 (FIG. 4A) at a step 650A. Then, the variable POUT representative of the page out number is increased by 1 at a step 660A, and is compared with the variable NPAGE at a step 670 so as to check whether or not the variable POUT reaches the number to be paged out. If the page out number is less than the variable NPAGE, the forward pointer 94A (FIG. 3A) of this entry 51C is set to the variable RPN at a step 680, and the processes defined from the step 600 are repeated. The above-explained process is ended to process all of the entries 51C of this queue, otherwise, it is repeated until the entry 51C appears having the unreferenced interval count lower than the condition during the initiation at a step 610, or a predetermined page (NPAGE) is paged out at a step 670. As previously stated, with respect to the pages dequeued to the 4 KB allocated page queue 810 (FIG. 5A) which has been allocated to the 4 KB page region 20, the page out is carried out in the unit of 4 KB, the internal subroutine OUT is returned and then the process is completed. Until a sufficient amount of the unused storage can be maintained, the unreference interval numbers to be paged out, one of the conditions for initiating the page out program 7 are sequentially reduced, and the page out program 7 may be repeatedly initiated. As a consequence, while maintaining the virtual page size at the conventional 4 KB, the page out process car be performed in the unit of the real page size of the real storage allocated to this virtual page size, and also the process overhead with respect to the page out can be lowered.

It should be noted that when the page which has been paged out in such a way is again utilized, as previously described in the preamble of the real page allocation program 2 (FIG. 2), the page fault occurs, this allocation program 2 is executed, after the real page for performing the page in process has been kept, the page in process (not shown) is operated. It should be understood that this page in process may be similarly executed as in the conventional page in process, and the virtual page, the page data set 5100 as described in FIG. 17, and the slot 5110 to store the virtual pages on this dataset, which each has been paged out are commonly 4 KB.

With the above-described process operations, the description of the first preferred embodiment of the present invention has been accomplished.

A description will now be made of a second preferred embodiment according to the present invention with reference to FIG. 8.

It should be noted that the same reference numerals used in the first preferred embodiment will be employed as those for denoting the same arrangements and utilization, and also the detailed circuit arrangements thereof will be similarly used in the second preferred embodiment.

In accordance with the second preferred embodiment, by taking virtual address, 2 GB (gigabytes) virtual address of a virtual storage 11A as a border, a 4 KB page region 110 constructed of a virtual page group 12 each having a 4 KB-page size, and a 64 KB page region 120 constructed of a virtual page group 13 each having a 64 KB-page size are arranged.

A real storage 10 is divided into two regions having different real page sizes, namely a 4 KB-page-sized region and a 64 KB-page-sized region, which is similar to that of the first preferred embodiment. Furthermore, each of these page-sized regions is subdivided into two regions, namely the entire regions are subdivided into four regions 20, 20A, 30 and 30A in total.

The region 20 is formed by a group of real pages 21 each having a 4 KB page size, and will be called as a "4 KB page exclusive region" hereinafter.

The region 20A is arranged by a group of real pages 21A each having a 4 KB page size, and will be referred to as a "4 KB page shared region." It should be noted that both of these regions are commonly called as a "4 KB page region."

The region 30 is constructed of a group of real pages 31 each having a 64 KB page size, and will be called as a "64 KB page shared region."

Then, the region 30A is constituted by a group of real pages 31A each having a 64 KB page size, and will be referred to as a "64 KB page exclusive region." It should be noted that both of these regions are commonly called as a "64 KB page region." That is to say, there is a difference in the second preferred embodiment such that both the regions 20A and 30A are added. As previously described in detail in the first preferred embodiment, the region 20 is such a region capable of allocating only the 4 KB virtual page. Also, as to the region 30, each of the 64 KB pages 31 constituting the 64 KB page regions 30 is divided into 4 KB regions, which is similar to that of the first preferred embodiment, and the respective split (divided) regions may be allocated to one 4 KB virtual page, otherwise each of the 64 KB pages 31 may be allocated to a single 64 KB virtual page, which is one of the inventive features. With respect to the region 20A, one of the features is such that each of the 4 KB pages 21A constituting this region may be allocated to a single 4 KB virtual page, and also the 16 continuous 4 KB pages 21A may be combined with each other so as to be allocated to a single 64 KB virtual page.

Further, the region 30A is such a region where only the 64 KB virtual page is allocatable.

Reference numeral 5 denotes a key storage for holding storage protection keys with respect to each page of the real storage 10A. Each entry 6 is arranged by areas for storing a storage protection key (SK7) which has been allocated to the corresponding page; a reference bit (R) 8 indicating whether or not this page is referred to; and a change bit (C) 9 representing whether or not this page is rewritten. The respective entries 6 for the key storage 5 are employed every page for the 4 KB page regions 20 and 20A, and every 64 KB for the 64 KB page regions 30 and 30A which is similar to that of prior art. In other words, the real page is set in a unit of attaching the storage protection key in accordance with the second preferred embodiment, which is similar to that of prior art. In the 64 KB page regions 30 and 30A, since the real page size is expanded from 4 KB to 64 KB, the key attaching number of the real storage per a unit capacity is reduced to 1/16 similar to that of the first preferred embodiment, as compared with the 4 KB page regions 20 and 20A, with the result that an increase of the key storage capacity is suppressed.

Figure 9:
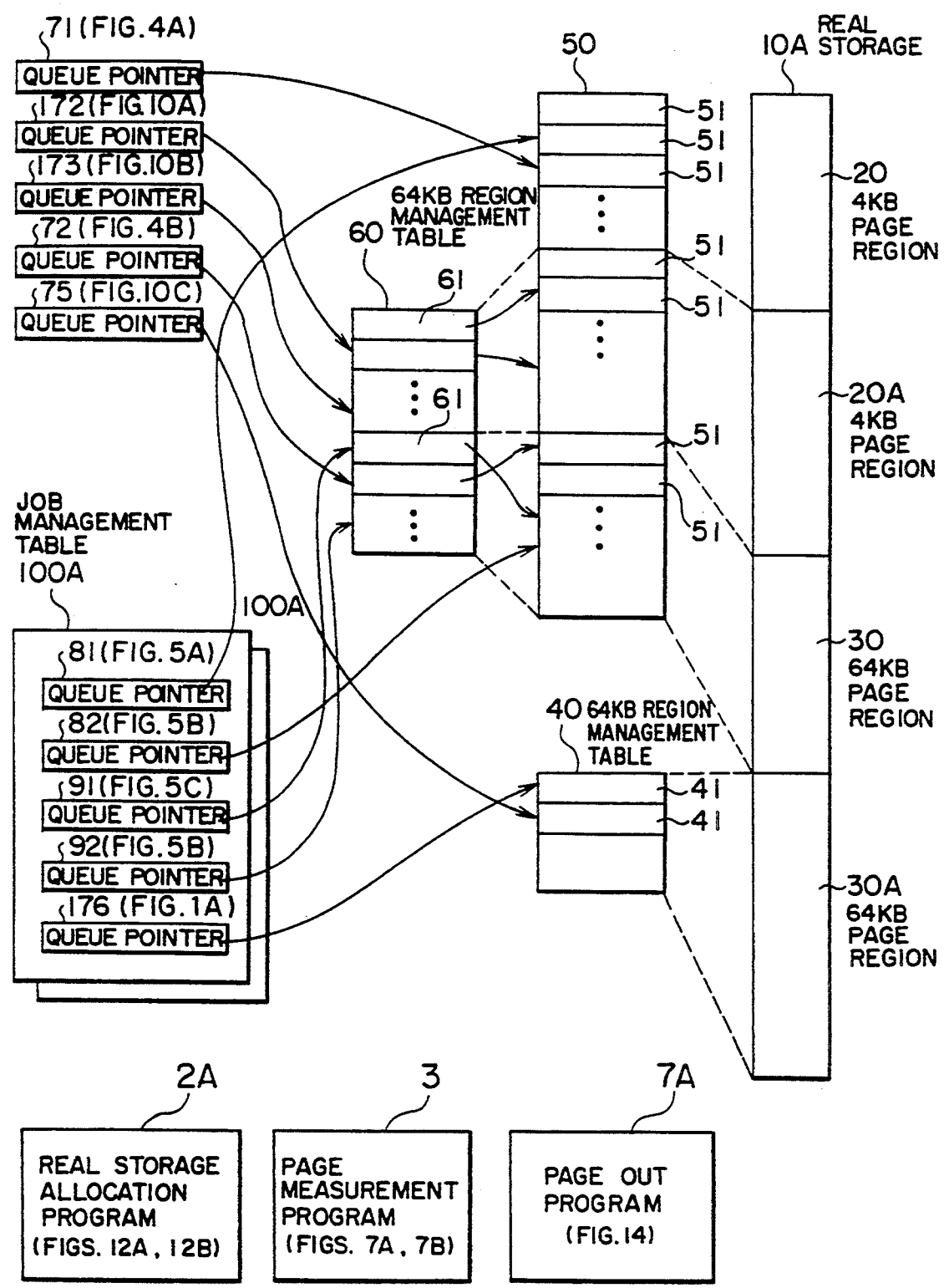
FIG. 9 illustrates a corresponding relationship between a constituent element and a real storage in the second preferred embodiment.

FIG. 9 represents a program and a management table contained in the operating system. In FIG. 9, reference numeral 2A indicates a real storage allocation program; reference numeral 3 denotes a page measurement program; and reference numeral 7A represents a page out program. In this real storage allocation program 2A, when a real storage allocation demand is made from the program with respect to the virtual page, the regions of the real storage are allocated in the unit of the virtual page. In this region allocation, one empty region (namely no loss caused by the fragmentation occurs) coincident with the virtual page size is selected from the real storage; an address of the selected real storage region is set to the entry of the address translation table corresponding to the virtual page to be located; and then the translation from the virtual address into the real address can be realized. In other words, the virtual page is translated to the real address in the present invention, which is similar to that of prior art. The function of the page measurement program 3 is to measure the use frequencies of the respective virtual pages which have been allocated to the real storage. This page measurement program 3 is employed to obtain a predetermined quantity of the usable real storage in such a manner that when the real storage is lacking for use, information on this real storage which has been allocated to the virtual page having the low use frequency by the page out program 7A are sequentially paged out into an auxiliary storage based upon this measurement result. In FIG. 9, reference numerals 50 and 60 indicate a real storage management table for managing the present allocation condition of the real storage. The 4 KB region management table 50 holds the real storage region having the same size as the virtual page size, namely holds an entry 51 corresponding to each of the 4 KB real pages (21, 21A groups) and also to each of the divided regions (31 group) of the respective 64 KB pages. Each entry holds information representative of the allocation condition of the 4 KB region with the corresponding real storage. As will be described later, a queue of an entry (queue 710 of an unallocated 4 KB region, FIG. 4A) corresponding to the 4 KB real storage region which has not yet been allocated to the virtual image is formed within the entry of this management table 50. Reference numeral 71 indicates a pointer for representing a lead entry of this queue. Also, the 64 KB region management table 60 has an entry 61 corresponding to the 16 pieces of the 4 KB real pages 21A of the 4 KB page region 20A, and an entry 61 corresponding to the 64 KB real pages in the 64 KB page region 30. Each of the entries holds information on the allocation condition of the corresponding 64 KB page in the unit of 64 KB. As will be discussed later, a queue of an entry (a queue 1720 of an unallocated 4 KB shared region, FIG. 10A a queue 1730 of a 4 KB partially allocated shared region (FIG. 10B); and a queue 720 for a 64 KB allocated region (FIG. 4B)) corresponding to the 64 KB real storage region which has not yet been allocated to the virtual page is formed for the entries of this management table 60. Reference numerals 172, 173, 72 indicate a pointer for indicating a lead entry of this queue. The 64 KB region management table 40 has an entry 41 corresponding to each of the 64 KB real pages 31A within the 64 KB page region 30A. Each entry holds information indicative of the allocation stage of the corresponding real storage region in the unit of 64 KB.

As will be described later, a queue (a queue 1750 for an unallocated 64 KB exclusive region (FIG. 10C)) of an entry corresponding to the 64 KB real storage region which has not yet been allocated to the virtual page is formed, among the entries of this management table 40. Reference numeral 175 is a pointer indicative of a lead entry of this queue. Also reference numeral 100A indicates a job management table which is employed for each program (job). In this management table, as will be described later, there is formed an entry queue (an allocated 4 KB page queue 810, FIG. 5A) within the table 50 corresponding to the 4 KB real page in which each job has been allocated to the virtual page under use. Reference numeral 81 denotes a pointer representative of a lead entry of this queue. Further, as will he described later, there is formed an entry queue (as allocated divided region queue 820, FIG. 5B) within the table 50 corresponding to the split region 1 which each job has been allocated to the virtual page under use. Reference numeral 82 indicates a pointer representative of a lead entry of this queue. Also, as to each job, there is formed an entry queue (a queue 910 for a partially not-yet-allocated 64 KB page, FIG. 5C) with respect to such a 64 KB real page that a part of the divided regions is not yet allocated, in which each job is under use for the 4 KB virtual page allocation. Reference numeral 91 denotes a pointer indicative of a lead entry of this queue. Further, as to the respective jobs, there is formed an entry queue (an all allocated 64 KB page queue 920, FIG. 5D) of the table corresponding to such a 64 KB real page that all of the divided regions thereof have been allocated, in which each job is under use for the 4 KB virtual page allocation. Reference numeral 92 is a pointer indicative of a lead entry of this queue.

Also, a queue (a 64 KB allocated page queue 1760, FIG. 11) of the entry 41 of the table 40 is formed with respect to the 64 KB real page 31A to which the 64 KB virtual page where the respective jobs are under use has been allocated. Reference numeral 176 indicates a point representative of a lead entry of this queue.

In FIGS. 3A and 3B, there are shown constructions of the respective management table entries 51 and entries 61. Since these constructions were explained in the first preferred embodiment, a detailed description thereof is omitted.

It should be noted that the information contained in one of the entries 41 for the 64 KB exclusive region management table 40 is the completely same as that of the entries 51 shown in FIG. 3A.

It should be also noted that although FIG. 3B represents the information contained in one of the entries 61 for the 64 KB region management table 60, the setting field of the second preferred embodiment is different from that of the first preferred embodiment when the 64 KB virtual page is allocated. That is to say, the fields 97, 98 and 99 are not used.

Then, a description will now be made of the respective queues which have been additionally employed in the second preferred embodiment, as compared with the first preferred embodiment.

Figure 10A:
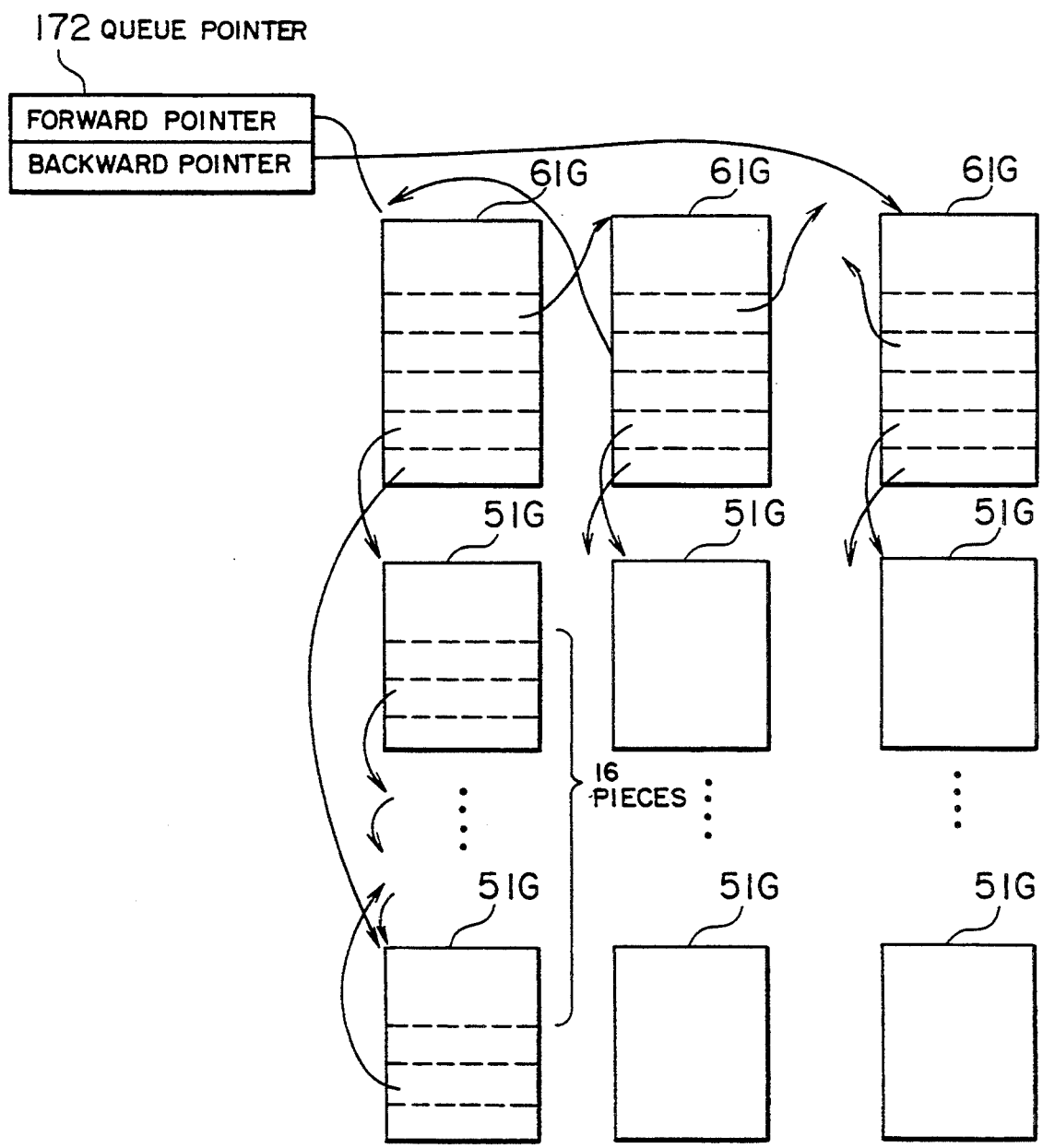
FIGS. 10A to 10C, and 11 are explanatory diagrams of real storage management tables according to the second preferred embodiments.

FIG. 10A represents a queue for shared area constructed of 4 KB unallocated pages. This queue is the same form as that of the queue 720 (FIG. 4E) according to the first preferred embodiment, and manages the regions within the 4 KB page region 20A of the real storage 10A in the unit of 64 KB. The virtual page is formed by a series of entries 61G for the table 60 which are provided every 16 pieces of the 4 KB unallocated, continuous real page 21A group, another series of entries 51G provided for each of the above-described 4 KB real page 21A groups, and also a queue pointer 172. Since the queue connections for the respective entries are the same as those of the above-described queue 720, no further description thereof is made in the following specification.

Figure 10B:
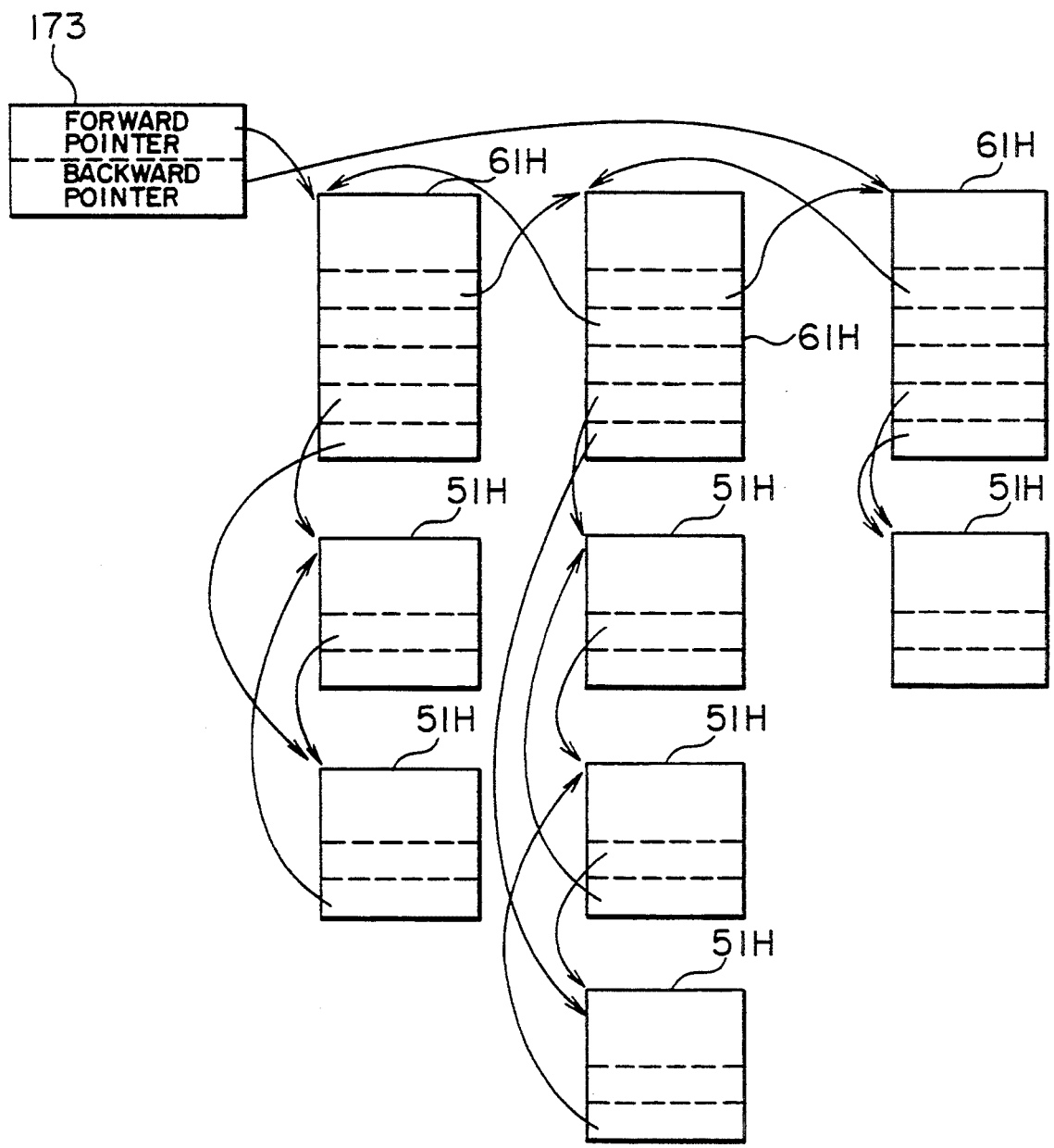

FIG. 10B represents a queue 1730 for shared area constructed of 4 KB partially allocated real pages. Although this queue has the same format as that of the previous queue 910 (FIG. 5C) in the first preferred embodiment, this queue 1730 is not formed for each job, which is different from the first preferred embodiment, and only one queue is constructed in the overall system. The queue 1730 is comprised of a group of entries 61H in the table 60, a group of entries 51H and a queue pointer 173. The entries 61H manage 4 KB page regions in the real storage 10A. In each of the entries 61H, at least one of continuous 4 KB real pages constituting the corresponding 64 KB real storage region has been allocated for 4 KB virtual page. The entries 51H manage the other unallocated 4 KB real pages of the respective entries 61H. Since the queue connections for the respective entries are the same as those of the above-mentioned queue 910, an explanation thereof is omitted. The reason why only one queue is formed in the overall system is as follows. The entries 61H are originally constructed of 16 pieces of 4 KB real page 21A groups, which is different from the previous queue 910, so that the key storage is present depending upon the entry 51H, and also the 4 KB real pages corresponding to the respective entries 51H can be allocated to the virtual page of the storage key and the job.

Figure 10C:
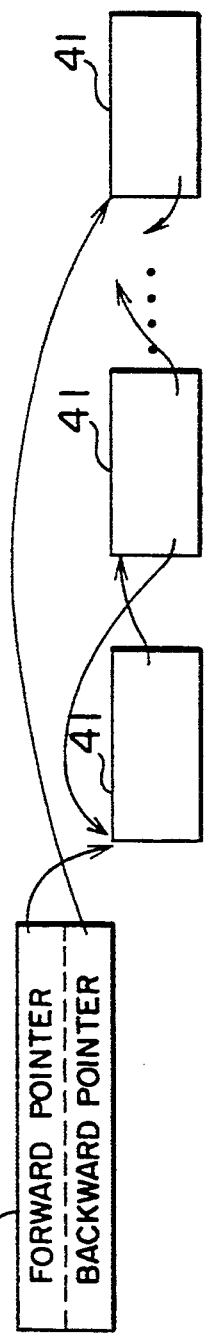

FIG. 10C represents a queue for exclusive area constructed of 64 KB unallocated real pages. This queue is formed by a series of the entries 41 for the table 40 where the virtual page on the 64 KB page exclusive region 30 has not yet been allocated, and a queue pointer 175. Similarly, as the queue connection for the queue is the same as that of the first preferred embodiment, an explanation thereof is omitted.

Figure 11:
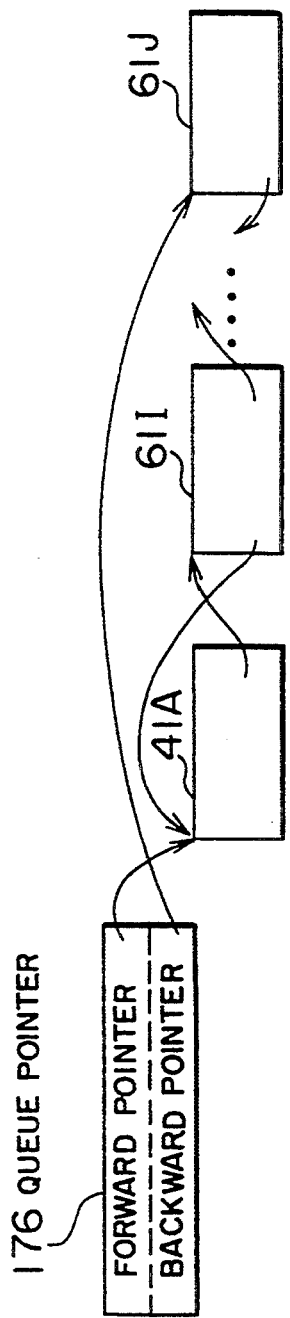

FIG. 11 illustrates a 64 KB allocated page queue. This queue is provided with each job, and constructed of a series of the entry 41 (on the region 30A) for the management table 40 which has been allocated to the 64 KB virtual page of this job irrelevant to the real page size; a series of entry 61I (on the region 20A) and entry 61I (on the region 30) of the management table 60, and a queue pointer 176.

Then, an operation of the real storage allocation program 2A will now be described.

Figure 12A:
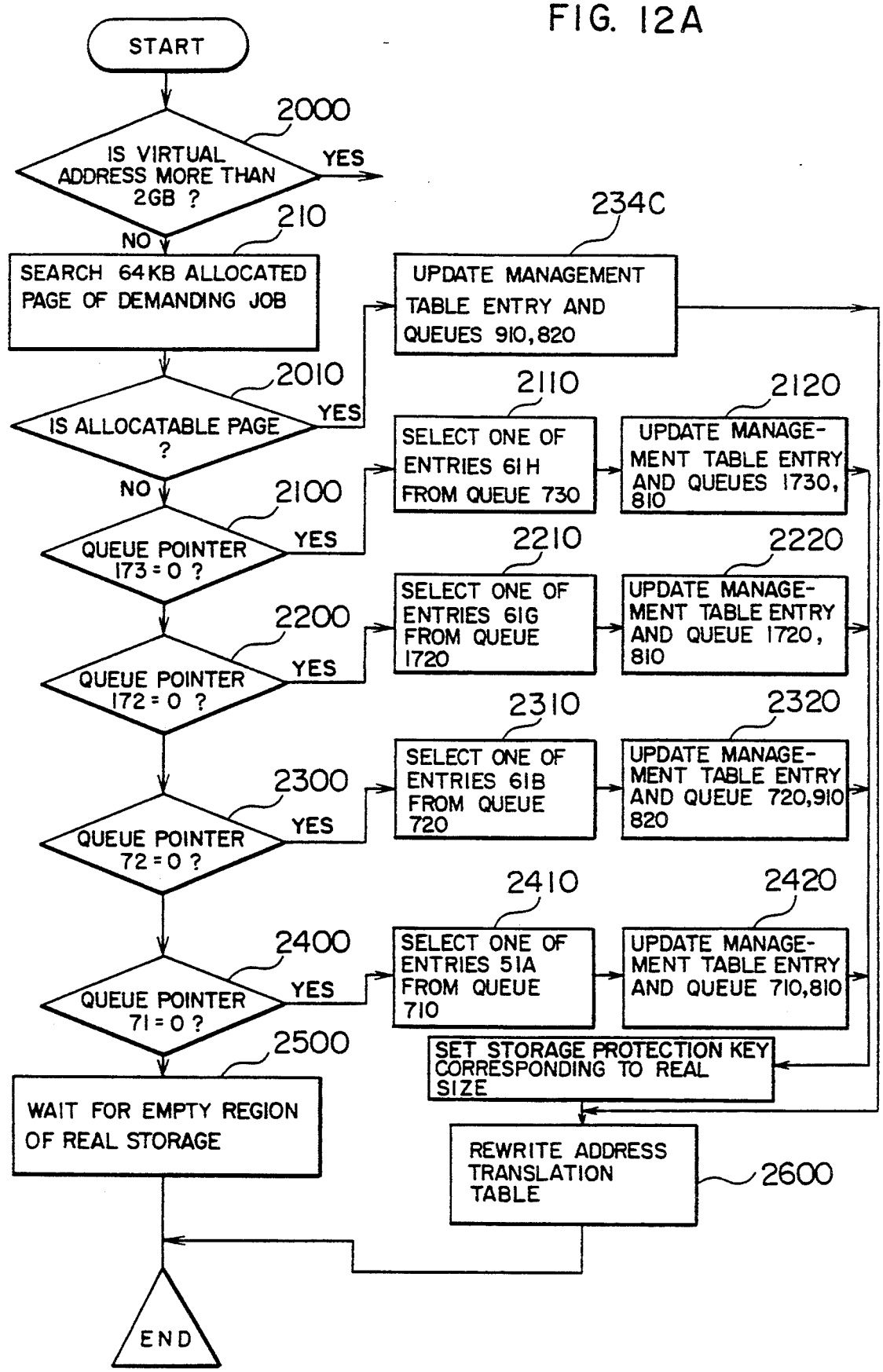
FIGS. 12A and 12B are process flowcharts for a page allocation program in the second preferred embodiment.
Figure 12B:
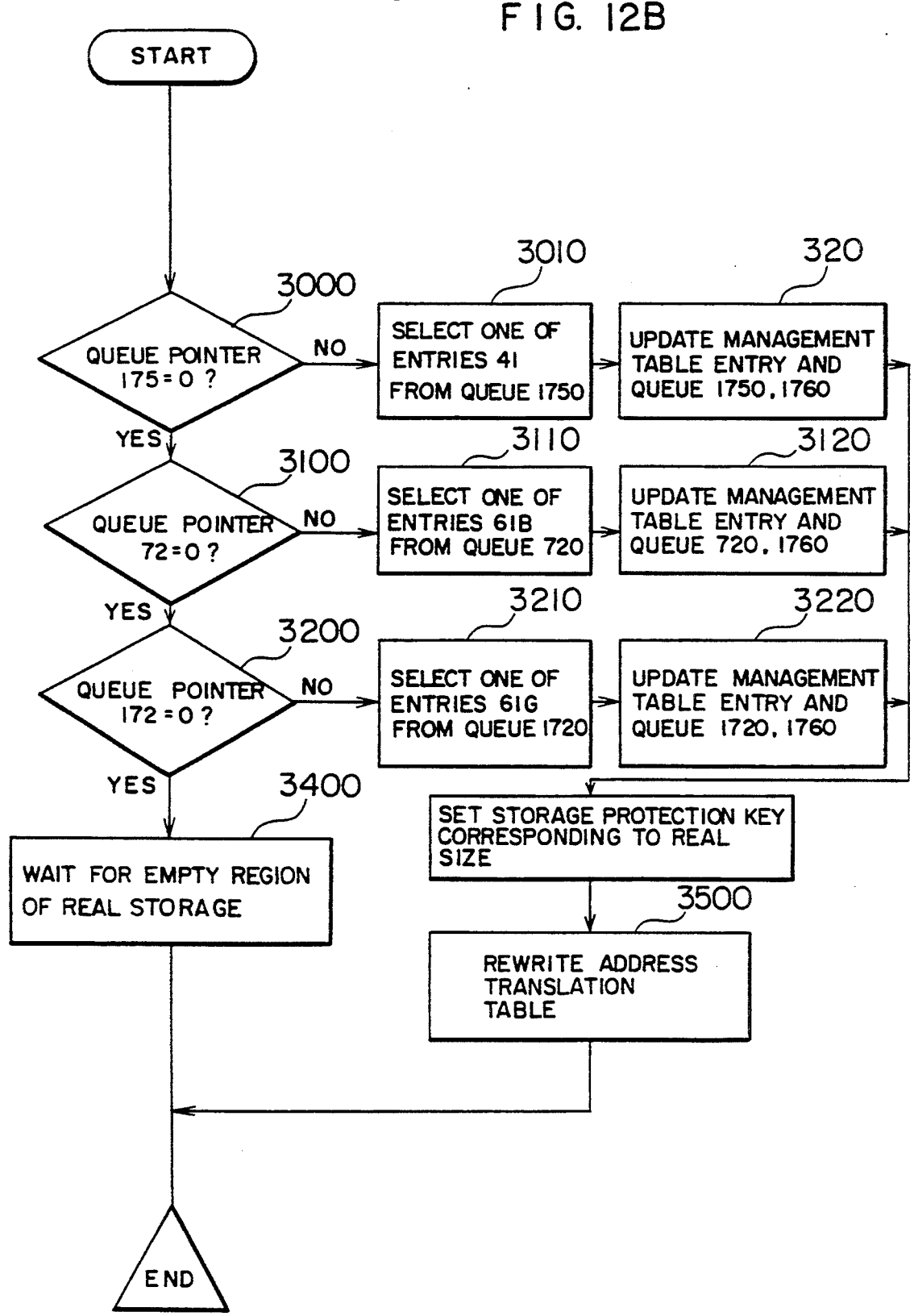

FIGS. 12A and 12B are flowcharts for explaining the page allocation program 2A. When a certain region of a virtual storage is accessed during an execution of a certain program (job), in case that a real storage region corresponding to this virtual region has not yet been allocated, a page fault interrupt occurs. In response to this interruption occurrence, a demand of a real storage allocation is made in order that the real storage region is allocated to the virtual region in a unit of a virtual page, and then the real storage allocation program 2A is initiated which is similar to the operation of the first preferred embodiment. However, there is a difference in the operation of the real storage allocation program because of the different arrangements of both the virtual storage and real storage.

First, an address translation mechanism employed in this preferred embodiment will now be summarized. In FIG. 16A, there is shown a selection circuit of the address translation mechanism employed in accordance with a format of two sorts of virtual addresses and a format of the respective virtual addresses.

Figure 8:
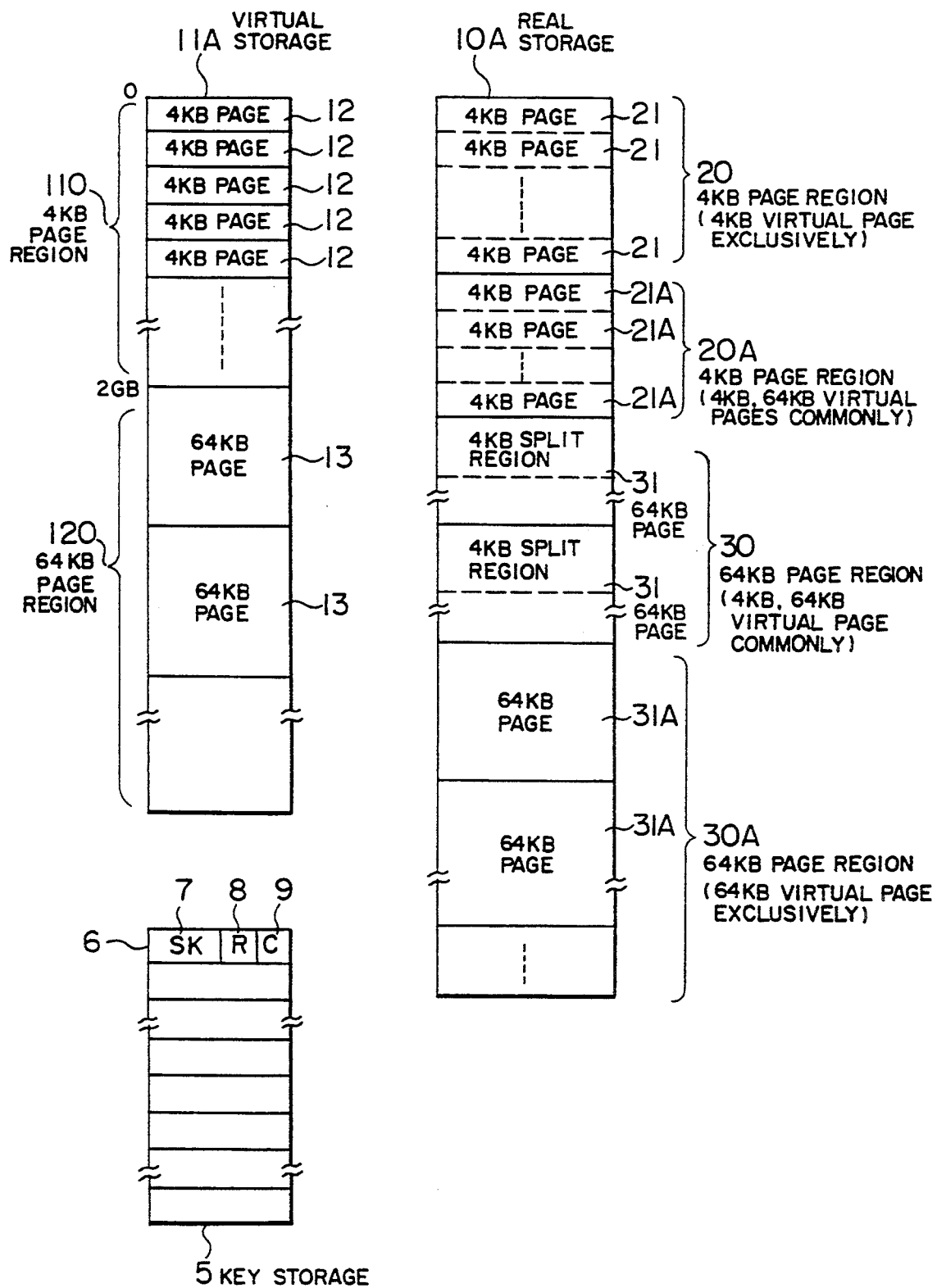
FIG. 8 is a configuration diagram of a virtual storage and a real storage according to the second preferred embodiment.

As shown in FIG. 8, the page sizes are different from each other, i.e., 4 KB pages and 64 KB pages with regards to the 2 GB virtual address.

Therefore, as shown in FIG. 16A, the virtual address format is constructed of two different sorts of address formats: an address format 6010 for more than 2 GB virtual address, and an address format 6020 for less than 2 GB virtual address. In accordance with these address formats, a judgement is made by a comparator 6030 whether or not 0 to 32 bits of the upper right unit for the virtual address are queued to zero, if a judgement result is "true" then it is judged that these bits are the virtual address of the format 6020, so that an address translation circuit 6200 is selected. Conversely, if a judgement result is "fault" then it is judged that these are the virtual address of the format 6010, whereby another address translation circuit 6100 is selected. To suppress an increase in the capacity of the address translation table, the address translation unit (segment and page's size) of only the region having more than 2 GB virtual address is expanded or extended, and the region having less than 2 GB virtual address corresponds to such a region which, so far exists only in prior art, and therefore has the same address translation unit due to its compatibility, which is a reason for the two sorts of virtual address formats. Then, operations of the respective address translation circuits which have been selected in the above-described ways, will now be described. First, since the operation of the address translation circuit 6200 which is selected in case of less than 2 GB virtual address is completely the same as that of the first preferred embodiment (FIG. 15B) except that as shown in FIG. 16C, the take-out position of the virtual address 6020 is selected for the 33rd bit to the 63rd bit, no explanation thereof is made.

Figure 16B:
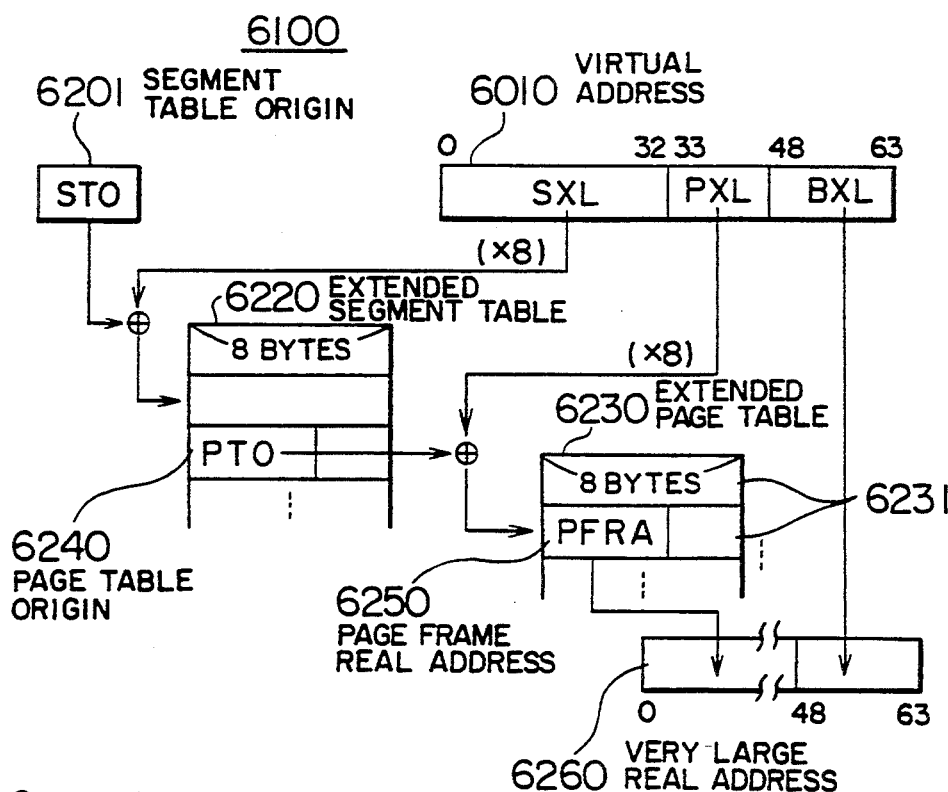
Figure 16C:
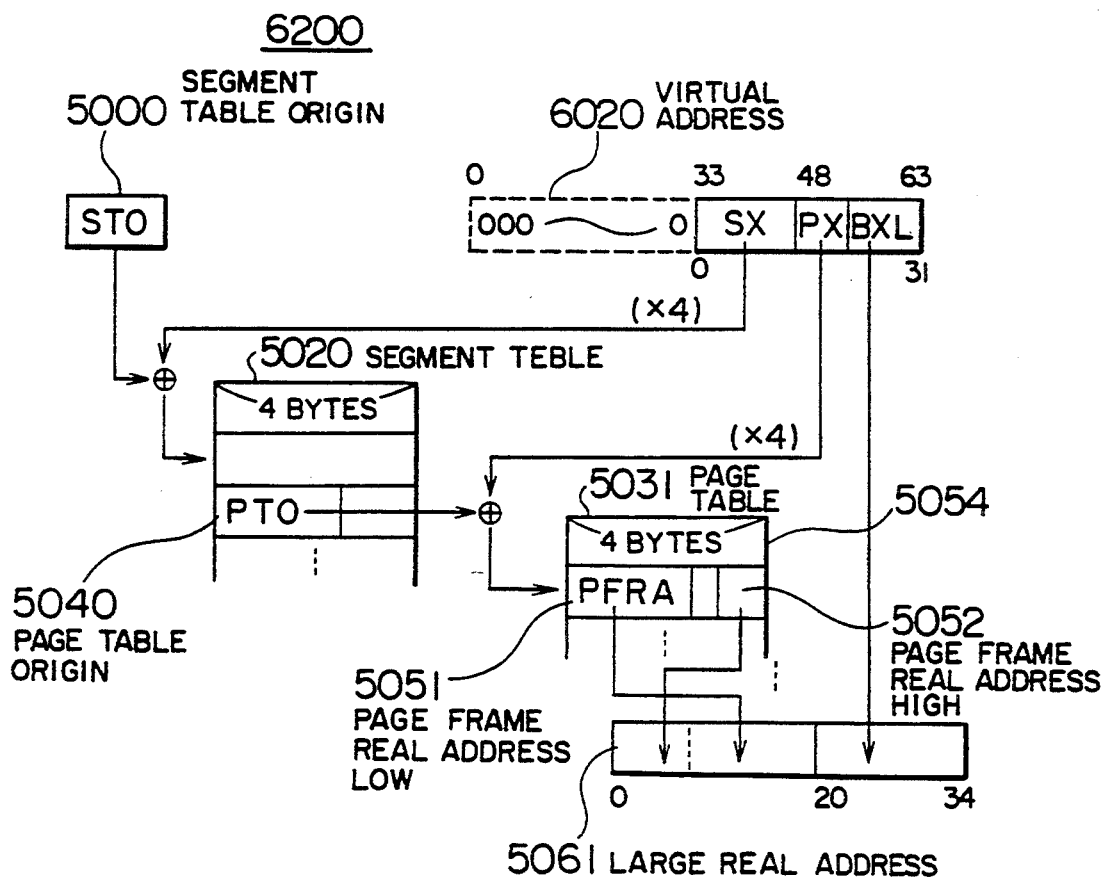

Referring now to FIG. 16B, the operation of the address translation circuit 6100 which is selected when the virtual address is more than 2 GB, will be described. As to more than 2 GB virtual address, a huge region up to 263 (maximum virtual address of format 6010) is realized in this preferred embodiment. To this end, a real storage apparatus required for such a huge region must have a large memory capacity, and also an address width of the real storage must be extended more than in the first preferred embodiment. Accordingly, each entry of a segment table and a page table used in the address translation circuit 6100 are extended, or expanded, and both an extended segment table 6220 and an extended page table 6230 are utilized. It should be noted in this preferred embodiment that the entry of the respective tables is extended so as to be equal to the corresponding virtual address width. With respect to this address translation circuit 6100, the structures of the respective tables and the operations thereof are the same as those of the conventional address translation (FIG. 15A), but there is the difference that both the virtual address width and real address width thereof are different from those of the conventional address translation. Accordingly, for the sake of simplicity the explanation is omitted.

The page allocation program 2A performs such a process that depending upon whether the virtual address is more than 2 GB or not, as previously described with reference to the first preferred embodiment, the real page address for the real storage to be allocated is set to the table entry of the respective address translations employed in the above-described two sorts of address translation circuits 6100 and 6200, and thus the address translations are possible. Such a process will now be expressed as a "real page allocation" (or a page allocation).

It should be understood that correctly speaking, the above-described "real page address" also includes lead addresses of 16 pieces of 4 KB pages (being managed by the queue 1720 (FIG. 10A) every 16 pages each having 4 KB) which continue on the 4 KB page region 20A for the real storage 10A, as described with reference to FIG. 8, namely each of the lead addresses of the 64 KB quasi real pages.

As similar to the first preferred embodiment, both setting the real page addresses to the above-described page table entries 5054 and 6231, and also setting the valid/invalid bit (not shown in the figures) into these entries will now be expressed as "an address translation table rewriting" (for instance, a step 2600 shown in FIG. 12A and a step 3500 shown in FIG. 12B).

Returning back to FIGS. 12A and 12B, a detailed operation of the page allocation program 2A will now be explained.

Once the real storage allocation program 2A is initiated a check is made at a step 2000 whether or not there is such a virtual address that a page fault interrupt occurs. If the virtual address is more than 2 GB, then an allocation of 64 KB virtual pages is executed, as described with reference to FIG. 12B. If the virtual address is lower than 2 GB, then the 4 KB virtual page allocation is carried out. In case of the 4 KB virtual allocation, first of all, a search process is executed for the 64 KB demanding job allocated page at a step 210, which has been described with regards to the first preferred embodiment. Since the detailed operation of this process was already described, no further explanation is made. However, this process is to effectively utilize the partially unallocated split regions within the 64 KB page occurring in such a case that the 64 KB pages are separately used, whereby the unallocated split regions within the 64 KB pages partially allocated to the demanding job are allocated to this job with priority. In case that the page is first allocated to the job, there is no 64 KB page partially unallocated to this job. As a result, since the search 210 fails, a description of this search 210 will be discussed later. When a judgement is made at a step 2010 that no partially unallocated page is found out, an unused page is searched from the queue for shared area consisting of 4 KB partially allocated pages (FIG. 10B). Also in this case, since the search fails at a step 2100 due to absence of the queue at the beginning, this process will be also described later. Thereafter, a check is made at a step 2200 whether or not the queue 1720 (FIG. 10A) for shared area constructed of the 4 KB unallocated real pages is equal to zero in order to search an unused page from this queue 1720. If this queue is not equal to zero, a selection is made of the entry 61G dequeued to the lead of this queue 1720. Furthermore, another selection is made of a lead entry of a series of entry 51G with respect to 16 pieces of the 4 KB page 21A group connected to this entry 61G, and the corresponding 4 KB page 21A is employed so as to be allocated. Then, both the management table entry and queue are updated at a step 2220. That is to say, the selection is made of the lead entry 51G connected to the entry 61G indicated by the internal pointer F (FIG. 3B) of the entry 61G; both the address of the virtual page to be allocated and the job ID of the demanding job are set into the fields 91A and 92A (FIG. 3A); and the number 96 of the allocated split regions within the selected entry 61G is increased by 1 (the initialization value thereof is zero).

Next, queue maintenance is performed as follows. That is to say, both the above-described selected entry 61G and 16 entries 51B connected thereto are dequeued from the queue 1720 for shared area constructed of the 4 KB unallocated real pages, and 15 entries (entries of the table 50 for the 4 KB unallocated page 21A group) among this entry 61G and 16 entries 51G other than the above-described selected entry 51G are connected to the queue 1730 (FIG. 10B) for shared area constructed of the 4 KB partial allocated real pages. In addition, the selected entry 51G is connected, or dequeued to the 4 KB allocated page queue 810 (FIG. 5A) provided for this job.

Furthermore, the storage key designated to the virtual page to be allocated (when it is not clearly designated from the job, the program key value of this job at this time instant) is set to SK7 of the entry 6 of the key storage 5 (FIG. 1) corresponding to the entry 51G to be allocated. It should be noted that the address of this 4 KB real page may be determined by checking that the selected entry 51G corresponds to which entry in the management table 50, namely the table index of the entry 51G. Based upon this 4 KB real page address, the storage key is set by employing the hardware instruction.

At a step 2600, the real address of the selected split region is set to the entry in the address translation table corresponding to the virtual page where the real storage allocation has been demanded, and also the validation of this entry is performed. Thus, this real storage region becomes usable. As a result, the first allocation for the queue 1720 for shared region constructed of the 4 KB unallocated pages is accomplished.

When the queue pointer 172 is equal to zero at the step 2200 of the above-described process, a judgement result is that there is no unallocated page on the region 20A. Then, a search for the 64 KB unallocated page is performed from the 64 KB unallocated page queue 720 (FIG. 4B), and one split region among the 64 KB unallocated pages is allocated. In other words, with employment of the 64 KB unallocated page queue 720 (FIG. 4B), a 64 KB unused page to be allocated to this job is found out. To this end, a judgement is first performed at a step 2300 to determine whether or not the value of the pointer 72 of this queue 720 is equal to zero, and a check is made whether or not there exists the entry 61B connected to this pointer 72.

If the pointer 72 is not equal to zero, a selection is made of the lead entry 61B of the queue 720 connected thereto at a step 2310. The lead entry of the series of entries 51B with respect to the 16 split regions connected to this entry 61B is selected and the corresponding split region is employed so as to be allocated.

Subsequently, both the management table entry and the queue are updated at a step 2320. That is to say, a selection is made of the entry 51B connected to the entry 61B indicated by the internal pointer F (FIG. 3B) of the entry 61B, both the address of the virtual page to be allocated and the job ID of the allocation demanding job are set to the fields 91A and 92A thereof, which is similar to that of the previous process, and then the number 96 of the allocated split region within the selected entry 61B is increased by 1 (the initial value thereof being zero), and furthermore the job ID of this job is set to the field 92B.

Next, queue maintenance is performed as follows. That is to say, both the above-described selected entry 61F and 16 entries 51B connected thereto are dequeued from the queue 720 for shared area constructed of the 64 KB unallocated real pages, and 15 entries (entries of the table 50 for the unallocated split regions) among this entry 61B and 16 entries 51B other than the above-described selected entry 51B are connected to the page queue 910 (FIG. 5C) for 64 KB partial allocated real pages. In addition, the selected entry 51B is connected, or dequeued to the allocated split region queue 820 (FIG. 5B) provided for this job.

Furthermore, the storage key designated to the virtual page to be allocated (when it is not clearly designated from the job, the program key value of this job at this time instant) is set to the field 97, and then the same key value as the value set to the field 97 is set to the entry 6 of the key storage 5 (FIG. 1) corresponding to the 64 KB real page containing the split region to be allocated. It should be noted that the address of this 64 KB real page may be determined by checking which entry of the management table 60 the selected entry 61B corresponds to (namely the table index of the entry 61B). Based upon the 64 KB real page address, the storage key is set by employing the hardware instruction, into the field SK7 (FIG. 8) of the corresponding entry 6 of the key storage 5. Also, this key storage writing operation is performed only when the split region is first allocated to the 64 KB unallocated page.

Moreover, the key entry 6 set at the step 2601 in this case is used by the hardware so as to check whether or not it can be accessed when any of the split regions on this 64 KB real page is accessed, which is similar to that of the first preferred embodiment.

At a step 2600, the real address of the selected split region is set to the entry in the address translation table corresponding to the virtual page where the real storage allocation has been demanded, and also the validation of this entry is performed. Thus, this real storage region becomes usable. As a result, the first allocation for the split region is completed from the 64 KB unallocated page queue 910.

At the step 2300 in the above-described process, if the queue pointer (72) is equal to zero, a judgement is made that no entry is present in the queue 910, and thus, an attempt is made to perform the allocation from the 4 KB unallocated page queue 710. In accordance with this process, one of the unallocated real pages with the 4 KB real page exclusive region 20 of the real storage 10A is selected as the real storage region to be allocated. This selection is carried out in such a manner that a check is made whether or not there is an entry dequeued to the 4 KB unallocated page queue 710 (FIG. 4A), if YES, then a selection is made of the entry 51A dequeued to the lead of the queue 710 at a step 2410. Next, at a step 2420, both the job ID of the allocation demanding job and the address of the virtual page to be allocated are written into this selected entry 51A. Furthermore, this entry 51A is enqueued from the above-described queue 710 and then dequeued to the 4 KB allocated page queue 810 (FIG. 5A) provided with this job. In addition, the storage key is set in the similar manner to that of the entry 51G, and updating of the address translation table is performed at a step 2600 in the similar way to that of the previous process. As a result, the allocation to the 4 KB real page is accomplished. Subsequently, the same process will be performed every time such a real storage allocation demand is newly made with respect to the 4 KB virtual page. In this case, the search 210 for the 64 KB allocated page of the demanding job, a detail of which was omitted, is also executed. A description will now be made of this process as follows.

Since the process of this step 210 has been explained in detail in the first preferred embodiment, a further explanation thereof is omitted. When the process defined at the step 210 is completed, a judgement is made at a step 2010 whether or not there is the 64 KB partially unallocated page which is allocatable to the 64 KB partially allocated page queue employed in this job. If yes, then the entry and queue thereof are updated at a step 234C. That is to say, a selection is made of one of the entries 51E for the unused split region connected to this entry 61E, and both the address of the virtual page to be allocated and the job ID thereof are set to this selected entry 51E in order that the split region corresponding to this entry should be used as the allocation region. Further, the number of the allocated split regions within the entry 61E is increased by 1.

The above-described entry 51E is enqueued from the above-mentioned queue 910 and dequeued to the allocated split region queue 820 employed for this job. If the number of the updated allocated split regions is equal to 16, there is no unallocated split region in the 64 KB real page containing the split regions to be allocated. As a consequence, in this case, the abovedescribed entry 61E corresponding to this 64 KB real page is also enqueued from the queue 910, and then is dequeued to the all allocated queue 920 (FIG. 5D) as the entry 61F. Thus, when the process defined at the step 234C is ended, the process defined at the step 2600 is executed in the similar manner to that of the previous process. If there is no 64 KB partially unallocated page at the above step 2010, another process which was not described in the previous explanation, is performed, namely, the allocation from the queue 1730 for shared area constructed of 4 KB partially allocated pages (FIG. 10B) is executed. This process is performed at a step 2100 in case that the pointer 173 of this queue is not equal to zero, and thereafter the lead entry 61H of the queue 1730 is derived at a step 2110. A selection is made of the lead entry of the series of the entry 51H with respect to the 4 KB page 21A group connected to this entry 61H, and the selected lead entry is used as an entry to be allocated.

Thereafter, both the management table entry and queue are updated at a step 2120. That is to say, a selection is made of the entry 5111 connected to the entry 61H indicated by the internal pointer F (FIG. 3B) of the entry 61H, both the address of the virtual page to be allocated and the job ID of the allocation demanding job are set to the fields 91A and 92A thereof, which is similar to that of the previous process, and then the number 96 of the allocated split region within the selected entry 61B is increased by 1 (the initial value thereof being zero). Next, the above-described entry 51H is enqueued from the above-described queue 1730, and dequeued to the 4 KB partially allocated page queue 810 (FIG. 5A) employed for this job. If the number of the above-described updated allocated split numbers are equal to 16, it is represented that all of the regions within the above-described entry 611 have been used. As a consequence, in this case, the above-mentioned entry 61H is also enqueued from the queue 1730. Thus, when the process defined at the stop 2120 is ended, a process defined at a subsequent step 2600 is similarly performed.

Also when there is no allocatable region in any of the above-described processes, a page out program 7A (FIGS. 14A and 14B) is operated (will be described later), this allocation demanding job is suspended at a step 2500 until a predetermined quantity of pages usable as the real storage can be maintained, so that the empty region in the real storage is waited upon. In this case, such an announcement is made to the page out program 7, that it is lacking the regions to which the virtual pages having certain page sizes are allocated. The above-described process may be repeated every time the real page allocation demand is made.

Next, when the page fault occurring address is more than 2 GB at the previous step 2000, the following process is carried out. In other words, the allocation process for the 64 KB virtual pages will now be described with reference to FIG. 12B. First, in the allocation process of the 64 KB virtual page, a check is made whether or not the queue pointer 175 is equal to zero at a step 3000 so as to search an unused page from the queue 1750 (FIG. 10C) for the 64 KB unallocated exclusive page. If this queue pointer 175 is not equal to zero, a selection is made of the entry 41 connected to a lead of this queue 1750 at a step 3010, and thus the selected entry is employed so as to be allocated. Subsequently, both the table entry and queue are updated at a step 320. That is to say, both the address of the virtual page to be allocated and the job ID of the allocation demanding job are set to the fields 91A and 92A (FIG. 3A) of this entry 41. Thereafter, the queue maintenance is performed as follows. That is to say, the above-described selected entry 41 is enqueued from the queue 1750 (FIG. 10C) for an exclusive area constructed of 64 KB unallocated real pages, and then is dequeued to the 64 KB allocated virtual page queue 1760 (FIG. 11) employed for this job. At the next step 3501, to a key storage entry which has been previously selected and corresponds to the 64 KB real pages of the entry 41, a key designated to the virtual page allocated to this 64 KB real page is set. Next, at a step 3500, the real address for the selected entry 41 is set into the entry within the address translation table corresponding to the virtual page where the real storage allocation has been demanded, and also this address translation table entry is validated.

Thus, this real storage area can be utilized. Accordingly, the allocation from the queue 1750 for the exclusive area constructed of 64 KB unallocated pages is accomplished.

When the queue pointer 175 is equal to zero at the step 3000 of the above-described process, a judgement result is that there is no unallocated page on the region 30A. Then, a search for the 64 KB unallocated page is performed from the 64 KB unallocated page queue 720 (FIG. 4B), and one split region among the 64 KB unallocated pages is allocated. In other words, with employment of the 64 KB unallocated page queue 720 (FIG. 4B), a 64 KB unused page to be allocated to this job is found out. To this end, a judgement is first performed at a step 3100 whether or not the value of the pointer 72 of this queue 720 is equal to zero, and a check is made whether or not there exists the entry 61B connected to this pointer 72.

If the pointer 72 is not equal to zero, a selection is made of the lead entry 61B of the queue 720 connected thereto at a step 3110, and the corresponding region is used to be allocated.

Subsequently, both the management table entry and the queue are updated at a step 3120. That is to say, both the address of the virtual page to be allocated and the job ID of the allocation demanding job are set to the fields 91A and 92A (FIG. 3B) thereof, and then the number 96 of the allocated split region within the selected entry 61B is increased by 16 (the initial value thereof being zero).

Thereafter, the queue maintenance is performed as follows. That is to say, the above-described selected entry 61B is enqueued from the 64 KB unallocated page queue 720 (FIG. 4B), and dequeued to the 64 KB allocated page queue 1760 (FIG. 11) employed for this job. Subsequently, setting the storage protection key is performed at a step 3501. The real page size of this case is selected to be 64 KB, which is similar to the previous case of the queue pointer 175, and also setting of the storage protection key is similarly executed. Subsequently, the real address of the selected region is similarly set to the entry within the address translation table corresponding to the virtual page where the real storage allocation has been demanded, and the entry of the address translation table is validated at a step 3500. Thus, this real storage region can be utilized.

When the queue pointer 72 is equal to zero at the step 3100 of the above-described process, a judgement result is that there is no entry on the queue 910 and the allocation from the queue 1720 (FIG. 10A) for shared area constructed of the 4 KB unallocated pages is attempted. In accordance with this process, the 64 KB unallocated region constructed of 16 pieces of the 4 KB continuous page 21A group within the shared region 20A constructed by the 4 KB real pages of the real storage 10A, is selected as the real storage region to be allocated. This selection is carried out in such a manner that a check is made at a step 3200 whether or not there exists an entry dequeued to the queue 1720 for shared region constructed of the 4 KB shared region constricted of the 4 KB unallocated real pages, and if yes, then the entry 61G dequeued to the lead of this queue 1720 is derived at a step 3210. Then, both the management table entry and queue are updated at a step 3220. That is to say, both the address of the virtual page to be allocated and the job ID of the allocation demanding job are set, and the number 96 of the allocated split regions within the selected entry 61B is increased by 16 (the initial value thereof is equal to zero).

Subsequently, the queue updating operation is performed in a similar manner to that of the previous updating operation. That is to say, the above-described selected entry 61G is enqueued from the queue 1720 (FIG. 10A) for shared area constructed of the 4 KB unallocated real pages, and then dequeued to the 64 KB allocated page queue 1760 (FIG. 11A) employed for this job. Next, setting the storage protection key is performed at a step 3501. In this case, the allocation to the real storage is carried out by grouping the 4 KB real pages into 16 groups, which is different from the previous queue. As a consequence, in accordance with the storage protection key setting at the step 3501, the key designated to the 64 KB allocation demanding virtual pages is set to all of the 16 storage key entries 6 corresponding to all of 16 pieces of the 4 KB grouped real pages.

It should be noted that when any of the 16 real pages is thereafter accessed, only the storage protection key corresponding to this real page is read out by the hardware, and then is compared with the access key which has been attached to the access demanding program at this time, whereby a check is made whether or not the access is permitted. According to this preferred embodiment, there exists a method wherein the storage protection key corresponding to the accessed real page is accessed, and this method is utilized even when the real pages are grouped. Thus the hardware which reads out the storage protection key may be similar to the hardware used when the real pages are not grouped. Next, the address translation table is rewritten at the step 2350, which is similar to the previous rewriting operation. Thus, the allocation of the real storage region with respect to the 64 KB virtual pages is accomplished. Thereafter, the same process is performed every time the real storage allocation demand is newly made with respect to the 64 KB virtual page.

When there is no allocatable region in any of the processes, this allocation demanding job is suspended at the step 2500 until a predetermined quantity of unused pages can be maintained, and the empty region of the real storage is waited upon. In this case, such an announcement is reported to the page out program 7A that the region for allocating the virtual page having the 64 KB page sizes is deficient. The above-described process is repeated every time the real page allocation demand with respect to the 64 KB virtual pages is established.

Thus, the page allocation can be mutually performed between the virtual storage region and the real storage region even if the virtual page size is the same as the real page size, but also is different from the real page size.

Next, an operation of the page measurement program 3 (FIG. 9) will now be described. FIGS. 7A and 7B are flowcharts representing the page measurement program 3. Although the steps 370 and 380 indicated by the dot line were not performed in the first preferred embodiment, all steps including these steps are executed in the second preferred embodiment. The operations of the page measurement program 3 according to the second preferred embodiment will now be explained.

A feature of the page measurement process according to this preferred embodiment is such that when the sizes of both the virtual page and the real page to which the real storage allocated to this virtual page belongs are different from each other, the page measurements are carried out for each of the regions where the sizes of the virtual page and of the real page thereof are great, which is similar to that of the first preferred embodiment.

A detailed operation of this page measurement process will now be described. Since the steps 310 to 340 and the steps 190, 400 have been described in detail in the first preferred embodiment, no further explanation is made for the sake of simplicity. First of all, in accordance with the page measurement program 3, a lead pointer 92 of the 64 KB all allocated page queue (FIG. 5B) 920 employed for a job to be page-measured is set to a variable QUEUE, and an internal subroutine SUB1 is called at a step 320.

This queue 920 corresponds to one of such queues representing the entry of the table 60 with respect to the 64 KB real page to which the 4 KB real page to which the 4 KB virtual page has been allocated, and all of the split regions within the above-described 64 KB real page indicates the 64 KB allocated page. In the above-described process the page measurement with respect to these pages is performed in the unit of 64 KB.

Thereafter, the page measurement is similarly performed in the unit of 64 KB with respect to the virtual page dequeued to another 64 KB partially allocated page queue 910 (FIG. 5C) among the 4 KB virtual pages allocated to the 64 KB page region 30.

Subsequently, the page measurement is carried out with respect to a new region allocated to the 64 KB virtual page. As previously described in the 64 KB virtual page allocation shown in FIG. 12B, all of the real storage regions allocated to the 64 KB virtual page are connected to the queue 1760 represented in FIG. 11 regardless of the sort of real storage. As a result, as represented in FIG. 7A, the queue pointer 176 of this queue 1760 is set to the variable QUEUE at the step 370, when the internal subroutine SUB 1 is called at the step 380, the page measurement can be performed with respect to the regions which have been allocated to all of the 64 KB virtual pages. That is to say, when the internal subroutine SUB 1 is called, a check is made whether or not there are entries 41, 61I and 61J to be page-measured by knowing whether or not the value of the variable QUEUE is equal to zero at a step 510.

Subsequently, if the entries exist, another check is made whether or not the 64 KB real page corresponding to the entries 41A, 61I, 61J instructed by the variable QUEUE is used at a step 440. This is executed by reading out the reference bit (R7) on the key storage entry 6 shown in FIG. 1 in response to the hardware instruction. If these reference bits are equal to zero, it can be understood that this page has not been used from the previous page measurement time instant until the present page measurement time instant. Then, if this page is used, the unreferenced interval count 93A (FIG. 3A or 3B) is cleared at a step 450, and these entries 41A, 61I, 61J are moved to the final position of this queue 1760 at a step 460. This entry movement is required so as to construct the queue in the order from the greatest unreferenced interval count 93A to the smallest unreferenced interval count. Next, if this page is not used, the unreferenced interval number is counted up at a step 470. As previously stated, a use frequency of a page indicates that the larger this unreferenced interval count, the lower this use frequency. This is because the unreferenced interval count is counted up every page measurement interval when this page is not used, and also the unreferenced interval count is set to zero when this page is used.

Subsequently, a forward pointer (FWP2) 94B in the entry under process is set to the variable QUEUE at a step 480, and the above-explained processes defined at the steps 510 to 480 are repeated for a new entry until the value of the variable QUEUE becomes zero, in other words, all of the entry connected to the queue 1760 have been processed. With the above-described process, the page measurement has been executed in the unit of 64 KB with respect to all of the preferred embodiments allocated to the virtual pages. Finally, the page measurement is carried out with respect to the 4 KB virtual pages allocated to the 4 KB page regions 20 and 20A. In this case, the page process is executed in the unit of 4 KB. All of the 4 KB virtual pages allocated to the 4 KB page regions 20 and 20A are connected to the 4 KB allocated page queue 810 (FIG. 5A). Also in this case, at a step 390, a pointer 81 representative of a lead entry 51C of the variable QUEUE, and the internal subroutine SUB1 is called at a step 400. In accordance with the subroutine SUB1, the page measurement process for the entry 51C dequeued to the above-described page queue 810 is executed in units of 4 KB by repeating the above-described processes, as defined from the step 510 to the step 480, with respect to the entry 51C dequeued to the above page queue 810. The above-described process may be carried out every time the job under execution utilizes a CPU for a predetermined time period. As a result, the page measurement process according to the second preferred embodiment may be executed in the unit of the larger page size between the virtual page size and also the real page size which has been allocated to this virtual page so that the page measurement number may be lowered.

Figure 14:
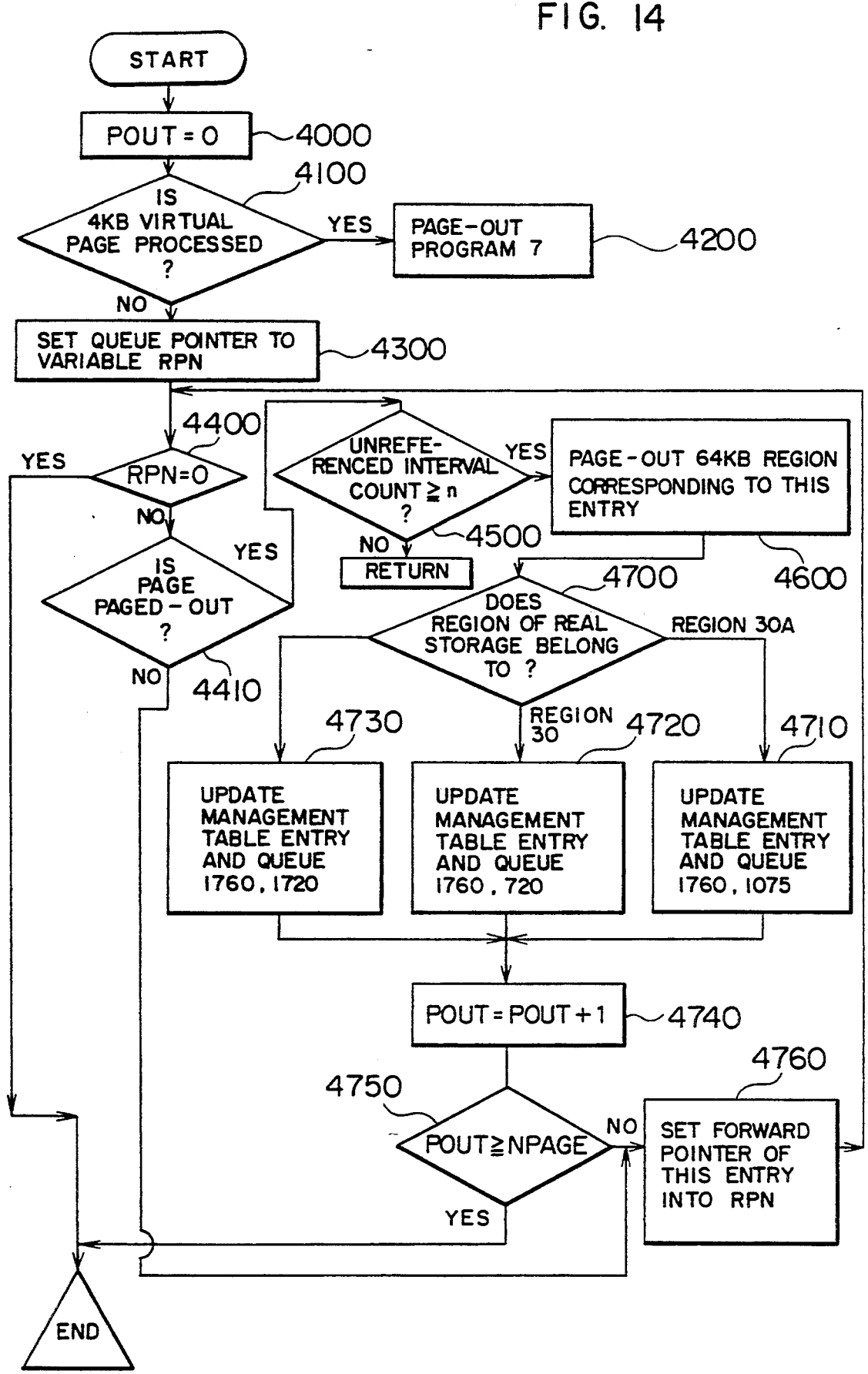
FIG. 14 is a process flowchart for a page out program in the second preferred embodiment.

Then, an operation of the page out program 7A (FIG. 9) will now be explained. The "page-out" described in this preferred embodiment implies, as similar to that of the first preferred embodiment, that based upon the page measurement result made by the above-described page measurement program, the real storage regions which have been allocated to the virtual pages area successively released from the virtual page having the low use frequency, and then the contents of the real storages are output to the auxiliary storage apparatus. Also, a judgement is made whether or not the contents of the real storages are actually output to the auxiliary storage apparatus by checking the change bit C (reference numeral 9 shown in FIG. 8), which is similar to that of the first preferred embodiment. FIG. 14 is a schematic flowchart of the page out program 7. The feature of the page out program process according to the second preferred embodiment is such that when a size of a virtual page is different from a size of a real page to which a real storage allocated to this virtual page belongs, the page out is executed in a page size corresponding to a larger size of one of the virtual page and real page. The operation thereof will now be described with reference to the drawing.

It should be understood, as similar to the first preferred embodiment that this page out program 7 is initiated once regions where the real storage is usable are less than a predetermined quantity, and also the program 7 is initiated so as to page-out "N" pieces of the pages whose unreferenced interval counts are more than a predetermined count "n." When the page out program 7 is initiated, a variable "POUT" for counting the page number which has been paged out is set to zero at the step 400. Thereafter, a judgement is made regarding which region allocated to the virtual page is processed. The region is designated by an operator when the page out program 7A is initiated. If the process for the 4 KB virtual page region is executed, the page out program 7 (FIGS. 13A and 13B) as described in the first preferred embodiment is executed. A detailed operation of this page out program has been already described. When it is judged that the process for the 64 KB virtual page is executed at a step 4100, a lead pointer 176 of the 64 KB allocated page queue 1760 (FIG. 11) which has been employed for the job to be paged out, is set to a variable "RPN"; and then the lead entries (any one of the entries 41A, 61I and 61J) of the queue 1760 to be paged out are set. Thereafter, at a step 4400, a check is made whether or not the entry to be paged out exists by checking whether or not the value of the variable RPN is equal to zero. If no entry exists, no process is performed and it is then returned. To the contrary, when the entry exists, a judgement is performed whether or not the page may be paged out at a step 4410.

This check corresponds to such a conventional check normally executed in the conventional virtual storage type computer that the page out of this page is prohibited (being page-filed), or it was page out processed at the previous page out process. If the page out is not allowed, to process the next page dequeued to the queue, any one of the entries 41A, 61I, 61J is set to the variable PRN at a step 4760, and then the processes defined from the step 4400 are repeatedly performed. If the page out operation is possible at the above step 4410, a check is made at a step 4500 whether or not this entry is higher than the number n instructed when the page out program is initiated. If this unreferenced interval count is smaller than the number n, the count of the subsequent entry 61E is similarly less than n, since the respective entries are successively arranged in the order from the largest unreferenced interval count to the smallest one. Accordingly, since no page for satisfying the page out initiation condition at this time exists in this queue, this process is returned.

Conversely, if the unreferenced internal number is less than n, the 64 KB real storage region corresponding to this entry is paged out at a step 4600 (however, if the change bit C (reference numeral 9 shown in FIG. 8) on the key storage corresponding to this entry is "off", the content of this real storage region is not transferred to the auxiliary storage apparatus, as similar to that of the first preferred embodiment), and further the entry of the address translation table corresponding to the virtual page is invalidated.

Further, this page out process is different from that of the first preferred embodiment, and the operation specific to the second preferred embodiment will now be described more in detail.

Figure 18:
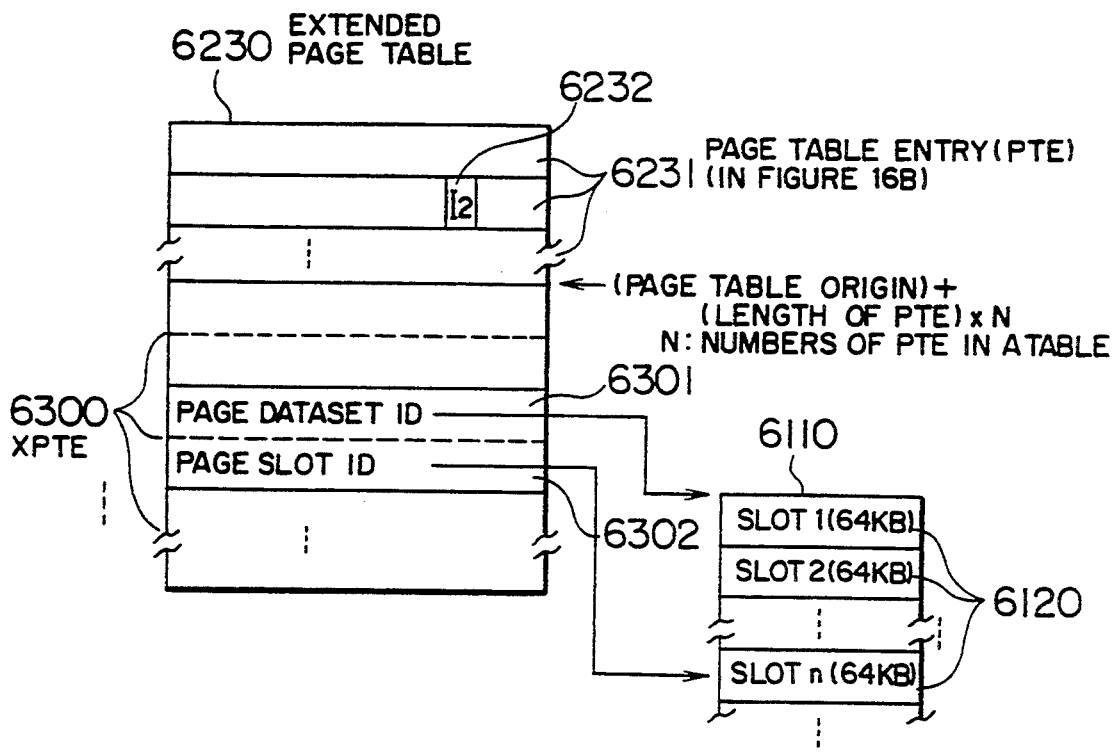
FIG. 18 schematically illustrates a management of a "page dataset" according to the second preferred embodiment.

FIG. 18 represents a management method for both a page table employed in the page out process and a slot used to store a page on a page data set. A role of the page table and also the slot used to store the page on the page data set has been already explained with reference to FIG. 17 in the first preferred embodiment. In accordance with this preferred embodiment, in order to process such a region having a memory capacity higher than 2 GB virtual address and also a virtual page having 64 KB page sizes, both the page table entry and the slot employed to store the page on the page data set as represented in FIG. 17 employed in the explanation of the first preferred embodiment have been extended, or expanded.

The extended page table 6230 is constructed of, as represented in FIG. 17, a page table entry 6231 group (referred to as a "PTE" group) and also an external page table entry 6300 group (referred to as a "XPTE" group) for managing where the page paged out is present on an auxiliary storage apparatus (for instance, a magnetic disk apparatus). PTE 6231 has been extended so as to store the addresses of the real storage having the large capacity, and XPTE 6300 has been extended so as to handle the auxiliary storage having the large capacity fitting with the large memory virtual region. The major page out process according to the management method is to set predetermined information on the page table, except for the above-described expansion.

The inventive feature of the above-described process step 4600 (FIG. 14) according to this preferred embodiment is as follows. There is a difference in the processes (steps 4710, 4720, 4730) defined from the page out step 4600 in such cases that the 64 KB virtual pages have been allocated to the 64 KB real pages, and also to the quasi-64 KB real pages constructed by collecting 16 pieces of serial 4 KB real pages.

Returning back to FIG. 14, a detailed operation of this feature point will now be described.

At a step 4700, a check is made as to which real storage region, the entry (any one of the entries 41A, 61I, 61J) which has been invalidated at the step 4600, belongs. In this case, each size of the respective four regions (region 20, region 20A, region 30, region 30A) of the real storage 10A as described in FIG. 8 is predetermined during the system initialization (IPL), and the real addresses of the lead and tail end for the respective regions are predetermined. The region to which this entry belongs can be known by comparing this real address with the variable RPN functioning as the pointer of this entry. In case that this entry belongs to the region 30A, the process defined at a step 4710 is executed, the entry 41A is enqueued from the queue 1760 (FIG. 11) and dequeued to the queue 1750 (FIG. 10C) for shared region constructed of the 64 KB unallocated real pages. At a next step 4740, the variable POUT representative of the page out number is increased by 1, and then is compared with the variable NPAGE in order to check whether or not the variable POUT reaches the number to be paged out. If the page out number is smaller than the variable NPAGE, the forward pointer of this entry 41A is set to the variable RPN at the subsequent step 4746, and the process defined from the step 4400 is repeated.

If the entry belongs to the region 30 at the previous step 4700, the process defined at a step 4720 is performed, the entry 61I is enqueued from the queue 1760, and further "0" is set to the number 96 of allocated split regions (FIG. 3B) on this entry 61I, and then the entry 61I is connected to the 64 KB unallocated page queue 720 (FIG. 4B). Subsequently, the variable POUT indicative of the page out number is increased by 1 at a step 4740, which is similar to that of the previous process, and is compared with the variable NPAGE so as to check whether or not the variable POUT reaches the number to be paged out at a step 4750. If the page out number is smaller than the variable NPAGE, the forward pointer of this entry 61I is set to the variable RPN at the next step 4746, and finally the process as defined from the step 4400 is repeated.

On the other hand, if the entry belongs to the region 20A at the previous step 4700, the process defined at the step 4730 is performed, the entry 61J is enqueued from the queue 1760, the allocated split region number 96 (FIG. 3B) is set to zero on this entry 61J, and furthermore the entry 61J is dequeued to the queue 1720 (FIG. 10A) for a shared area constructed of the 4 KB unallocated real pages.

Then, the variable POUT representative of the page out number is increased by 1 at a step 4740, which is similar to the previous process operation, and is compared with the variable NPAGE so as to check whether or not the variable POUT reaches the number to be paged out. If the page out number is less than the variable NPAGE, then the forward pointer of this entry 61J is set to the variable RPN at a step 4746, and the process defined from the step 4400 is repeated. The above-described processes are repeated until all of the entries for this queue have been processed at the step 4400, or such an entry appears which has an unreferenced interval count lower than the condition provided during the initiation at the step 4500, otherwise a preselected page number (NPAGE) has been paged out at the step 4750.

With the above-explained processes, the page out operation has been accomplished in the unit of 64 KB with respect to the real storage region which has been allocated to the 64 KB virtual pages. If the unused real storage regions could not be sufficiently obtained by performing the above-described processes, the page out program 7A may be repeatedly initiated while the unreferenced interval count to be paged out, which is one of the above-mentioned conditions during the initiation of the page out program 7A, is successively lowered. With the above-described process operations, the page out process for the second preferred embodiment where there are two different sizes in the virtual page size and real page size respectively, can be performed with the larger page size among the virtual page sizes and the real page sizes of the real storage allocated to the virtual page.

It should be noted that when the pages thus paged out are again utilized, as previously described in the real page allocation program 2A (FIG. 9), a page fault occurs, this real page allocation program 2A is activated, and a page-in process (not shown in detail) is operable after a real page used to perform the page-in operation can be maintained. In accordance with this page-in process, the page data set 5100 is employed as described in FIG. 17 in case that the virtual address where the above-described page fault occurs is less than 2 GB, whereas the page data set 6110 is employed as described in FIG. 18 in case that this virtual address is more than 2 GB. As a consequence, after the real page has been maintained in conformity to the virtual page size in the above-described real page allocation program 2A (FIG. 9), the page-in process itself may be executed in a similar manner to the conventional page-in process since the virtual page size of the virtual address where the above-described page fault occurs, is the same as the slot size used to maintain the virtual page on each of the page data sets.

In accordance with the second preferred embodiment, even when the virtual page size is not necessarily coincident with the real page size no problem occurs; the real storage expansion may be realized with a higher free degree; the real page quantity managed by the operating system is reduced to 1/16 by extending the real page size to 64 Kilobytes, as compared with the conventional 4 Kilobytes, so that the management overhead can be lowered.

According to the present invention, since the mutual page allocations may be achieved among the regions constructed of the various real storages/virtual storages having the different sizes, the main storage may be effectively managed. Furthermore, the page measurement process may be performed in the unit of the larger page size between the virtual page size and real page size, whereby the measurement number is reduced and therefore the overhead may be considerably lowered.

In particular, when the allocation unit of the virtual storage (virtual page size) is different from the arrangement unit of the real storage (real page size), the real storage is managed in the larger unit, the arrangement unit of the divisionally managed (when real page is large), or continuous real storage (when virtual page is large) is managed, and the real storage is utilized with priority as compared with the partially allocated storage. As a consequence, transfer of the fragmentation to a plurality of large management units can be prevented, with the fragmentation occurring frequently. Therefore, a problem can be avoided wherein, although there is an empty region of the real storage for the fragmentation, the allocation size for the continuous virtual storage cannot be maintained, and moreover the utilization efficiency can be improved when the storage is managed in the large unit.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A method for allocating a real storage to a plurality of virtual pages of a virtual storage, the real storage containing a plurality of real pages, storage keys used for storage protection purposes of said real pages being stored in a key storage which has a plurality of storage locations, each corresponding to one of the real pages, said method comprising the steps of:

(a) allocating one of a plurality of split regions, each split region having a first size, to one of the plurality of virtual pages, said one virtual page having the first size, the split regions being obtained by subdividing one of the plurality of real pages contained in the real storage, said one real page having a second size equal to n, "n" being a positive integer larger than one, times the first size;

(b) repeating the step (a) so that others of the plurality of the split regions within said one real page and split regions having the first size which are obtained by subdividing other real pages having the second size within the plurality of real pages are allocated to other virtual pages having the first size within the plurality of virtual pages;

(c) storing a storage key for each real page of a group of real pages including the one real page and said other real pages, into a storage location corresponding to said each real page, within said key storage when one of the split regions within said each real page is first allocated to one of the virtual pages at the step (a) or when repeating step (a) in accordance with step (b), among the split regions within said each real page, wherein the storage key is the same as one predetermined for said one of the virtual pages; and (d) determining whether or not a reference demand is permitted upon a split region within one real page of the group of real pages, based upon the storage key stored for the one real page and an access key given to the reference demand, when the reference demand is subsequently made upon the split region for access thereof by a program.

2. A method as claimed in claim 1, wherein said repeating of step (a) in accordance with step (b) includes the steps of:

(b1) finding one real page having the second size, which is a partially allocated real page which has at least one split region already allocated to one virtual page, having the first size, and at least one other split region not yet allocated to any of the virtual pages, the one real page having a storage key already stored coincident with a storage key predetermined for another virtual page having the first size, to which the real storage is to be allocated; and (b2) allocating the at least one other split region within said one real page to the another virtual page, in case the one real page has been found in step (b1).

3. A method as claimed in claim 2, wherein said one real page has at least one split region already allocated to one virtual page used by a program utilizing the another virtual page.

4. A method as claimed in claim 2, wherein repeating the allocating step (a) in accordance with step (b) further includes the steps of:

(b3) finding an unallocated real page which has no split region allocated to a virtual page, when said one real page has not been found in step (b2); and (b4) allocating one split region within the found unallocated real page to the another virtual page.

5. A method for allocating a region of a real storage to a plurality of virtual pages of a virtual storage, the real storage containing a plurality of real pages, storage keys used for storage protection purposes of said real pages being stored in a key storage which has a plurality of storage locations, each corresponding to one of the real pages, said method comprising the steps of:

(a) allocating a plurality of real page groups, each real page group being constructed of n, ("n" being a positive integer larger than one, successive real pages, within the plurality of real pages and each real page of each real page group having a first size, to a plurality of virtual pages having a second size which is "n" times the first size;

(b) storing a same storage key for each real page within one group of the real page groups into a storage location corresponding to said each real page within said key storage, when the one real page group is allocated to a virtual page in accordance with the step (a), wherein the same storage key is one designated for the virtual page;

(c) determining whether or not a reference demand is permitted upon one of the real pages, within one real page group within the real page groups, based upon a storage key stored in said key storage for the one real page within the one real page group and an access key given to the reference demand, when the reference demand is subsequently made by a program upon the one real page for access thereof.

6. A method as claimed in claim 5, further comprising the steps of:
- (d) selectively storing a reference signal, indicative of occurrence of reference, into a storage location corresponding to the one real page within said key storage, when the one real page is referenced by a program;
- (e) determining whether or not each group of real page groups have been referred to, each group of the real page groups being one which has been allocated to one of the virtual pages in the step (a), depending upon whether a reference signal has been stored in said key storage for at least one of the real pages contained in said each real page group, in accordance with step (d);
- (f) selecting one group of the real page groups that has been allocated to one of the virtual pages having the second size based upon a determination result of the step (e) for each group of real page groups which has been allocated to virtual pages having the second size, when part of said real storage is to be paged-out; and
- (g) paging-out "n" real pages contained in the selected one real page group.

7. A real storage allocation method for allocating a region of a real storage to a plurality of virtual pages of a virtual storage, the real storage containing a plurality of real pages, storage keys used for storage protection purposes of said real pages being stored in a key storage which has a plurality of storage locations, each corresponding to one of the real pages, the method comprising the steps of:
- (a) allocating a first real page group constructed of real pages, each of the real pages having a first size and not yet having been allocated to any of the plurality of virtual pages, to a first virtual page having a second size equal to n, being a positive integer larger than one, times the first size, and included in the plurality of virtual pages of the virtual storage, when the real storage is to be allocated to the first virtual page, the first real page group being selected from a plurality of real page groups each constructed of n successive real pages, each successive real page included in the plurality of real pages of the real storage and each successive real page having the first size;
- (b) selecting a second real page group having at least one real page which has not yet been allocated to a virtual page, from among the plurality of real page groups, when the real storage is to be allocated to a second virtual page having the first size, and allocating said at least one real page of the second real page group to the second virtual page;
- (c) storing a storage key designated for the first virtual page as a storage key for each of n real pages contained in the first real page group into storage locations corresponding to said n real pages, within said key storage, when the first real page group is allocated to the first virtual page in step (a);
- (d) storing a storage key designated for the second virtual page as a storage key for said at least one real page of the second real page group into a storage location corresponding to said at least one real page, within said key storage, when said at least one real page of the second real page group is allocated to the second virtual page in step (b);
- (e) repeating steps (a) and (c) for allocation of other real page groups within the groups of real pages to other virtual pages having the second size;
- (f) repeating steps (b) and (d) for allocation of other real pages within said second real page group or other real page groups to other virtual pages having the first size; and
- (g) determining whether or not a reference demand is permitted upon one of the real pages included in one of the real page groups, based upon a storage key stored in said key storage for the one real page and upon an access key designated for the reference demand, when the reference demand is subsequently made upon the one real page, irrespective of whether the real pages of the one real page group have been allocated to a virtual page having the second size or to virtual pages having the first size.

8. A method as claimed in claim 7, further comprising the steps of:
- (h) storing into said key storage a reference signal for one real page of one real page group (a real page group of a first sort) within the plurality of real page groups which have been allocated to a virtual page having the second size in step (a) or when repeating step (a) in accordance with step (e) when the one real page has been subsequently referenced, the reference signal indicating that the one real page has been referenced;
- (i) storing, into said key storage, a reference signal for one of the real pages of another real page group (a real page group of a second sort) within the plurality of real page groups which have at least one real page which has been allocated to a virtual page having the first size in steps (b) or (h), when the one real page of the another real page groups has been subsequently referenced;
- (j) determining whether or not a reference has been made to each real page group of the first sort based upon whether or not a reference signal has been stored in said key storage for at least one of the real pages within said each real page group of the first sort; and
- (k) determining whether or not a reference has been made to each real page within each real page group of the second sort, depending upon whether or not a reference signal has been stored in said key storage for said each real page within said each real page group of the second sort.

9. A method as claimed in claim 8, further comprising the steps of:
- (l) selecting either one real page group of the first sort or one real page within one real page group of the second sort based upon a determination result made in step (j) for each real page group of the first sort and also a determination result made in step (k) for each real page within each real page group of the second sort;
- (m) paging-out one real page of one real page group of the second sort without paging-out other real pages of the one real page group of the second sort when the one real page has been selected in step (l); and
- (n) paging-out n pieces of real pages of the one real page group when the one real page group of the first sort has been selected in step (l).

10. A method of allocating a region of a real storage to a plurality of virtual pages of a virtual storage, the real storage containing a plurality of real pages, storage keys used for storage protection purposes of said real pages being stored in a key storage which has a plurality of storage locations, each corresponding to the real pages, the method comprising the steps of:

(a) allocating a first real page group constructed of n, being a positive integer larger than one, successive real pages having a first size which have not yet been allocated to any of the plurality of virtual pages, to a first virtual page having a second size equal to n times the first size and included in the plurality of virtual pages of the virtual storage, when the real storage is to be allocated to the first virtual page, the first real page group being selected from a plurality of real page groups constructed of n successive real pages having the first size and included in the plurality of real pages of the real storage; and (b) selecting a second real page group having at least one real page having the first size, which has not yet been allocated to any of the plurality of virtual pages from the plurality of real page groups, and allocating the one real page within the selected second real page group to a second virtual page having the first size, when the real storage is allocated thereto, wherein a partially allocated real page group is preferably selected as the second real page group rather than an unallocated real page group, wherein the partially allocated real page group includes a real page which has been allocated to one of the virtual pages having the first size and a real page which has not yet been allocated to any of the virtual pages having the first size, and wherein the unallocated real page group does not include a real page which has been allocated to any virtual page.

11. A method for allocating a real storage to a plurality of virtual pages of a virtual storage, the real storage containing a plurality of real pages, the method comprising the steps of:

(a) allocating, to a virtual page having a second size equal to n, being a positive integer larger than one, times a first size and included in the plurality of virtual pages of the virtual storage, one real page having the second size, or a real page group constructed of n successive real pages having the first size which have not yet been allocated to any of the plurality of virtual pages when the real storage is to be allocated to the virtual page having the second size, the one real page having the second size being selected from a plurality of real pages having the second size and included in the plurality of real pages of the real storage and the n successive real pages having the first size being selected from a plurality of real pages having the first size and contained in the plurality of real pages of the real storage; and (b) allocating to a virtual page, having the first size and included in the plurality of virtual pages of the virtual storage, one of the plurality of real pages having the first size or one of n split regions obtained by dividing one of the plurality of real pages having the second size, when the real storage is to be allocated to the virtual page having the first size.

12. A method as claimed in claim 11, wherein the allocating step (a) includes the steps of:

(a1) first selecting one of the plurality of real pages having the second size which has not yet been allocated to any one of the plurality of virtual pages having the second size; and (a2) secondly selecting a real page group constructed of n successive real pages having the first size which have not yet been allocated to the virtual page, from among the plurality of real pages having the first size, if the one real page having the second size not allocated to any virtual page cannot be selected at step (a1).

13. A method as claimed in claim 11, wherein the allocating step (b) includes the steps of:

(b1) first selecting one split region not yet allocated to any virtual page, included in a partially allocated real page having the second size within the plurality of real pages having the second size, the partially allocated real page having the second size containing at least one split region allocated to one of the virtual pages having the first size and at least one split region not yet allocated to any of the virtual pages having the first size;

(b2) secondly, selecting one real page not yet allocated to any virtual page, belonging to a partially allocated real page group, having the second size if there is no partially allocated real page having the second size selected at the step (b1), the partially allocated real page group being constructed of n successive real pages having the first size which contain at least one real page which has been allocated to one of virtual pages having the first size and at least one real page having the first size which has not yet been allocated to any one of the virtual pages having the first size; and (b3) thirdly, selecting an unallocated real page group, if no partially allocated real page group is selected at step (b2), the unallocated real page group being constructed of n successive real pages having the first size which have not yet been allocated to any of the virtual pages.

14. A method as claimed in claim 11, wherein the allocating step (a) includes the steps of:

(a1) first selecting one of the plurality of real pages having the second size which has not yet been allocated to one of the virtual pages having the second size; and (a2) secondly selecting a real page group constructed of n successive real pages having the first size which have not yet been allocated to the virtual page, from the real pages having the first size, if the one real page having the second size which has not been allocated to any virtual page cannot be selected at step (a1), and furthermore the allocating step (b) yet includes the steps of:

(b1) first selecting one split region not allocated to any virtual page included in a partially allocated real page having the second size within the plurality of real pages having the second size, the partially allocated real page having the second size containing at least one split region allocated to one of the virtual pages having the first size and at least one split region not yet allocated to any of the virtual pages having the first size;

(b2) secondly selecting one real page not yet allocated to any virtual page, belonging to a partially allocated real page group having the second size, if there is no partially allocated real page having the second size to be selected at step (b1), the partially allocated real page group being constructed of n successive real pages having the first size which contain at least one real page which has been allocated to one of virtual pages having the first size, and also at least one real page having the first size which has not yet been allocated to any of virtual pages having the first size; and (b3) thirdly selecting one real page belonging to an unallocated real page group, if no partially allocated real page group is selected at step (b2), the unallocated real page group being constructed of n successive real pages having the first size which have not yet been allocated to any of the virtual pages.

15. A method as claimed in claim 14, wherein both another plurality of real pages having the second size and another plurality of real pages having the first size are included in the plurality of real pages of the real storage, wherein the another plurality of real pages having the second size can be allocated to a virtual page having the second size, but cannot be allocated to a virtual page having the first size, and also the another plurality of real pages having the first size, can be allocated to a virtual page having the first size, but cannot be allocated to a virtual page having the second size; the step (a) further includes the step of:

(a0) selecting, before executing step (a1), one of the another plurality of real pages having the second size which has not yet allocated to a virtual page having the second size, if there is any, otherwise executing the step (a1); and the step (b) further includes the step of:

(b4) selecting one of the another plurality of real pages having the first size which has not yet been allocated to a virtual storage, when no selection is made of such an unallocated real page group at step (b3).

16. A method for allocating a real storage to a plurality of virtual pages of a virtual storage, a plurality of real pages being contained in the real storage, storage keys being stored in correspondence to the real pages in a key storage for protection thereof, the key storage having a plurality of storage locations each corresponding to one of the real pages, the method comprising the steps of:

(a) allocating one of a plurality of split regions, each split region having a first size, to one of the plurality of virtual pages, the one virtual page having the first size, the split regions being obtained by subdividing one of the plurality of real pages, the one real page having a second size equal to n, being a positive integer larger than one, times the first size; and (b) repeating step (a) so that others of the plurality of split regions within said one real page and a plurality of split regions, having the first size, which are obtained by subdividing other real pages having the second size within the plurality of real pages, are allocated to other virtual pages having the first size within the plurality of virtual pages.

17. A method as claimed in claim 16, further comprising the step of:

(c) determining whether or not each real page of a group of real pages including said one real page and said other real pages has been referred to, depending upon whether at least one of the split regions within said each real page already allocated to a virtual page having the first size has been referred to by a program;

(d) selecting one group of the group of real pages based upon a determination result in step (c) for each real page of the group of real pages, when a real storage region to be paged-out is selected; and (e) selectively paging-out a plurality of split regions already allocated to virtual pages among a plurality of split regions within the selected real page.

18. A method as claimed in claim 16, wherein a plurality of real pages, each having the first size, is further included in the real storage; said method further including the step of:

allocating one of the plurality of real pages having the first size to one virtual page having the first size among the plurality of virtual pages, when use of a real page having the first size is predetermined with respect to allocation of the real storage to the one virtual page, the allocating step (a) being performed when use of a real page having the second size is predetermined with respect to allocation of said real storage to the one virtual page.

19. A method as claimed in claim 16, wherein a plurality of real pages, each having the first size, is further included in said real storage, said method further including the step of:

(c) determining, based upon a predetermined allocation condition, whether or not there exists at least one real page having the second size which has at least one split region allocable to a virtual page which has the first size and to which the real storage should be allocated; and (d) allocating one of the plurality of real pages having the first size to the virtual page in case there is no real page having the second size which has an allocable split region, the step (b) including the step of allocating, when there is a real page having the second size which has at least one split region allocable to the virtual page, the at least one split region to the virtual page.

* * * * *